United States Patent
Tuukkanen et al.

(10) Patent No.: US 10,775,180 B2
(45) Date of Patent: Sep. 15, 2020

(54) METHOD AND APPARATUS FOR SYNCING AN EMBEDDED SYSTEM WITH PLURALITY OF DEVICES

(71) Applicant: HERE GLOBAL B.V., Eindhoven (NL)

(72) Inventors: Marko Tapio Tuukkanen, Schlenzer (DE); Joachim Meister, Berlin (DE); Jens Von Lindequist, Berlin (DE); Henrik Hinrichs, Berlin (DE)

(73) Assignee: HERE Global B.V., Eindhoven (NL)

(*) Notice: Subject to any disclaimer, the term of this patent is extended or adjusted under 35 U.S.C. 154(b) by 290 days.

(21) Appl. No.: 15/749,417

(22) PCT Filed: Aug. 2, 2016

(86) PCT No.: PCT/EP2016/068458
§ 371 (c)(1),
(2) Date: Jan. 31, 2018

(87) PCT Pub. No.: WO2017/021420
PCT Pub. Date: Feb. 9, 2017

(65) Prior Publication Data
US 2018/0224291 A1    Aug. 9, 2018

Related U.S. Application Data

(60) Provisional application No. 62/200,495, filed on Aug. 3, 2015.

(51) Int. Cl.
*G01C 21/34*     (2006.01)
*G08G 1/0968*    (2006.01)
(Continued)

(52) U.S. Cl.
CPC ... *G01C 21/3423* (2013.01); *G08G 1/096811* (2013.01); *G08G 1/096883* (2013.01);
(Continued)

(58) Field of Classification Search
CPC ......... G01C 21/3423; G08G 1/096811; G08G 1/096883; H04L 67/1095; H04L 67/12; H04W 12/06
See application file for complete search history.

(56) References Cited

U.S. PATENT DOCUMENTS

2008/0033635 A1* 2/2008 Obradovich ...... H04L 29/12122
701/533
2009/0318168 A1* 12/2009 Khosravy .......... G06Q 30/0241
455/456.3

(Continued)

FOREIGN PATENT DOCUMENTS

WO     2017021420 A1    2/2017

OTHER PUBLICATIONS

International Search Report and Written Opinion of the International Searching Authority for related International Application No. PCT/EP2016/068458, dated Oct. 10, 2016, 10 pages.
(Continued)

*Primary Examiner* — Courtney D Heinle
(74) *Attorney, Agent, or Firm* — Ditthavong & Steiner, P.C.

(57) ABSTRACT

An approach is provided for synchronizing a function among an embedded system and/or one or more devices. The approach involves causing, at least in part, an authentication of at least one user at an embedded system. The approach also involves causing, at least in part, an association of the at least one user with at least one cloud account associated with the embedded system. The approach further involves causing, at least in part, a registration of one or more devices associated with the at least one user to the at least one cloud account. The approach also involves causing, at least in part, a synchronization of at least one function, data associated with the at least one function, or a combi-
(Continued)

nation thereof among the at least one embedded system, the one or more devices, or a combination thereof based, at least in part, on the registration.

19 Claims, 25 Drawing Sheets

(51) Int. Cl.
    *H04L 29/08*     (2006.01)
    *H04W 12/06*     (2009.01)

(52) U.S. Cl.
    CPC .......... *H04L 67/1095* (2013.01); *H04L 67/12* (2013.01); *H04W 12/06* (2013.01)

(56) References Cited

U.S. PATENT DOCUMENTS

| | | | | |
|---|---|---|---|---|
| 2014/0164322 A1* | 6/2014 | Beaurepaire | ....... | G01C 21/3438 707/610 |
| 2014/0164432 A1 | 6/2014 | Beaurepaire et al. | | |
| 2014/0189888 A1* | 7/2014 | Madhok | ............ | H04L 63/0807 726/29 |
| 2014/0310788 A1* | 10/2014 | Ricci | .................... | G06F 16/583 726/6 |
| 2015/0210287 A1* | 7/2015 | Penilla | ................. | B60W 40/08 701/49 |
| 2016/0070527 A1* | 3/2016 | Ricci | ..................... | G06F 3/165 715/716 |
| 2016/0216130 A1* | 7/2016 | Abramson | ........ | G01C 21/3626 |
| 2019/0020985 A1* | 1/2019 | Dai | ........................ | H04L 51/02 |

OTHER PUBLICATIONS

Diewald et al., "Mobile Device Integration and Interaction in the Automotive Domain", IN AAutoNUI: Automotive Natural User Interfaces Workshop at the 3rd International Conference on Automotive User Interfaces and Interactive Vehicular Applications (AutomotiveUI 2011), Nov. 29-Dec. 2, 2011, 4 pages.

* cited by examiner

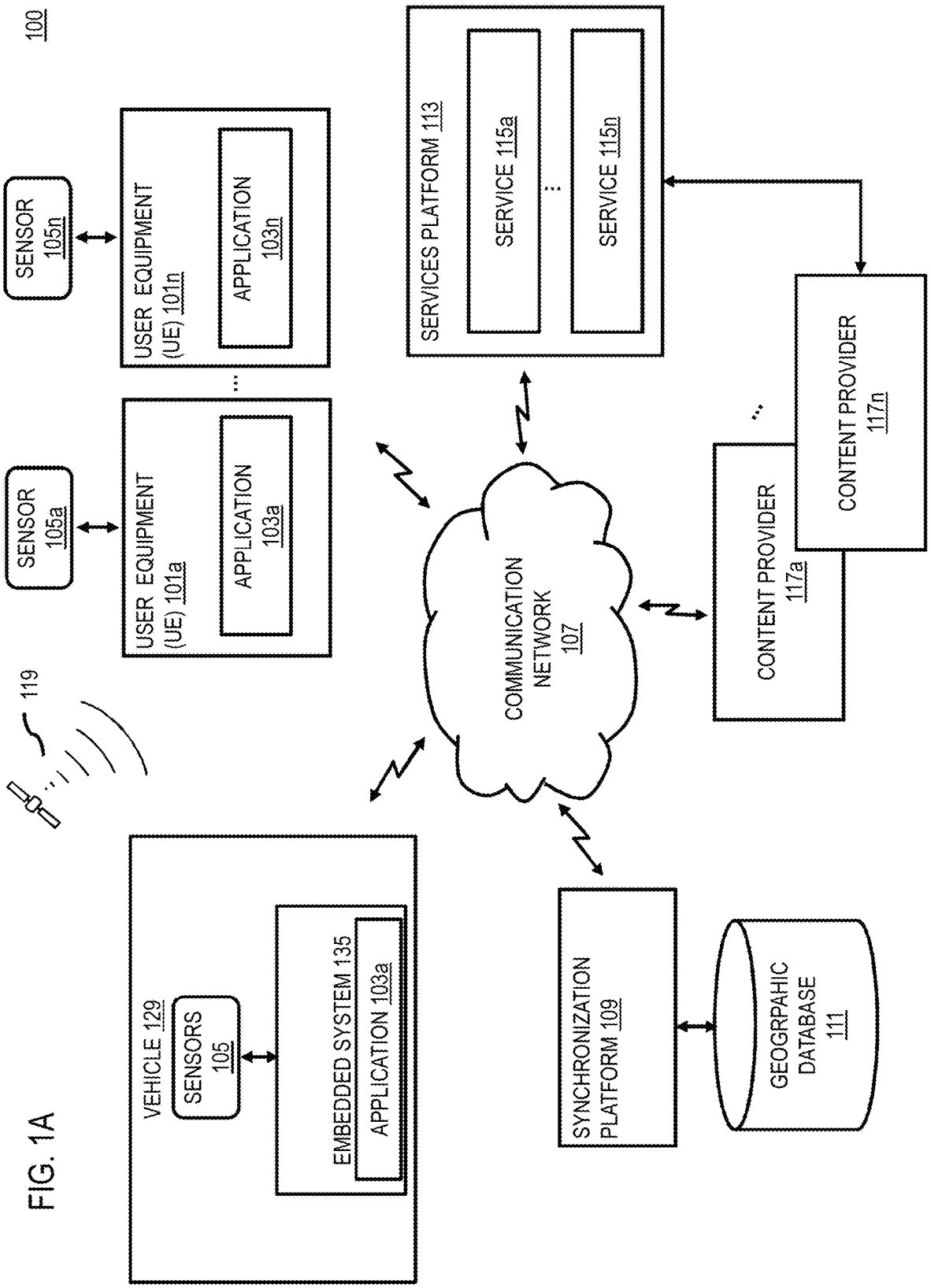

START → 501 DETERMINE THAT THE EMBEDDED SYSTEM AND/OR THE DEVICES IS WITHIN A DISTANCE THRESHOLD FROM A WAYPOINT

→ 503 PROCESS AND/OR FACILITATE A PROCESSING OF LOCATION INFORMATION AND/OR MAPPING INFORMATION TO GENERATE A RECOMMENDATION OF A WALKING SEGMENT AND/OR A DRIVING SEGMENT AND/OR A TRANSPORT LINE

→ 505 CAUSE A LINKING OF THE DEVICES AND/OR THE EMBEDDED SYSTEM AND/OR THE CLOUD

→ 507 CAUSE THE SYNCHRONIZATION OF THE RECOMMENDATION AMONG THE EMBEDDED SYSTEM AND/OR THE DEVICES FOR REAL-TIME TRANSMISSION

→ END

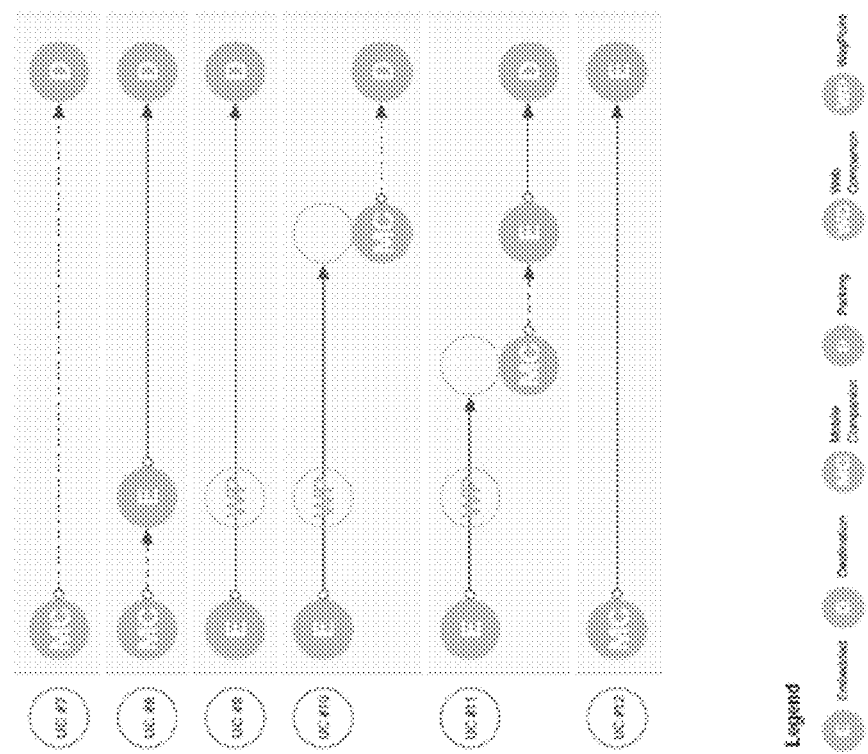
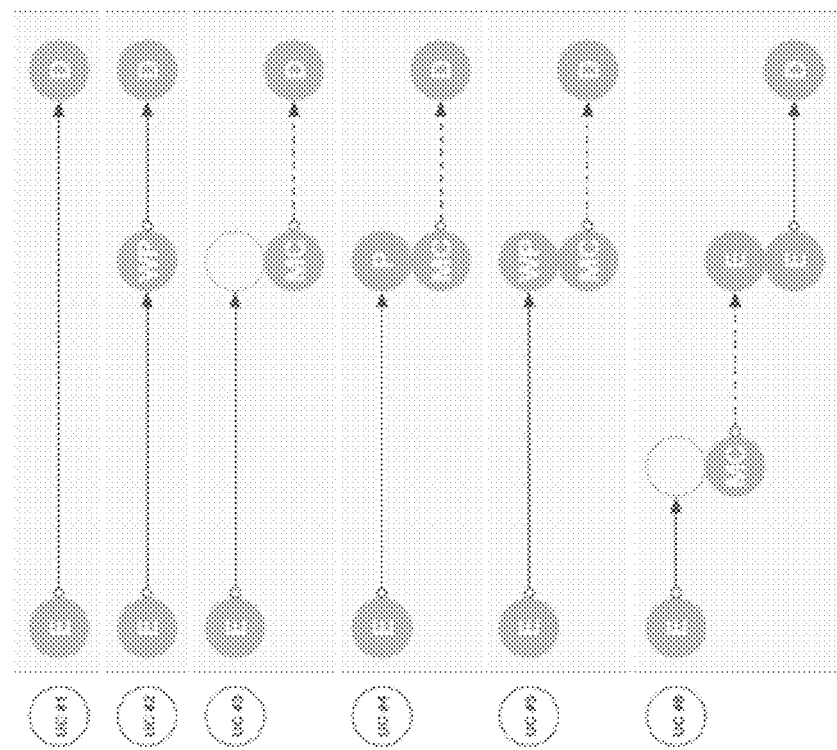
FIG. 9

FIG. 10

METHOD AND APPARATUS FOR SYNCING AN EMBEDDED SYSTEM WITH PLURALITY OF DEVICES

CROSS-REFERENCES TO RELATED APPLICATIONS

This application claims priority from a PCT Application Serial No. PCT/EP2016/068458, entitled "METHOD AND APPARATUS FOR SYNCING AN EMBEDDED SYSTEM WITH PLURALITY OF DEVICES," filed on Aug. 2, 2016, which claims priority from U.S. Provisional Application Ser. No. 62/200,495, entitled "METHOD AND APPARATUS FOR SYNCING AN EMBEDDED SYSTEM WITH PLURALITY OF DEVICES," filed on Aug. 3, 2015, the contents of which are hereby incorporated herein in their entirety by this reference.

BACKGROUND

Service providers and device manufacturers (e.g., wireless, cellular, etc.) are continually challenged to deliver value and convenience to consumers by, for example, providing compelling network services. In particular, these include services for sharing content and communications among different clients of an automotive system. By way of example, a user may wish to have location information shared between an embedded system and a mobile device. Unfortunately, current mechanisms does not provide for instantaneous sharing of content amongst various clients of an automotive system.

SOME EXAMPLE EMBODIMENTS

Therefore, there is a need for an approach for synchronizing a function among an embedded system and/or one or more devices.

According to one embodiment, a method comprises causing, at least in part, an authentication of at least one user at an embedded system. The method also comprises causing, at least in part, an association of the at least one user with at least one cloud account associated with the embedded system. The method further comprises causing, at least in part, a registration of one or more devices associated with the at least one user to the at least one cloud account. The method also comprises causing, at least in part, a synchronization of at least one function, data associated with the at least one function, or a combination thereof among the at least one embedded system, the one or more devices, or a combination thereof based, at least in part, on the registration.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an authentication of at least one user at an embedded system. The apparatus is also caused to cause, at least in part, an association of the at least one user with at least one cloud account associated with the embedded system. The apparatus is further caused to cause, at least in part, a registration of one or more devices associated with the at least one user to the at least one cloud account. The apparatus is also caused to cause, at least in part, a synchronization of at least one function, data associated with the at least one function, or a combination thereof among the at least one embedded system, the one or more devices, or a combination thereof based, at least in part, on the registration.

According to another embodiment, a computer-readable storage medium carries one or more sequences of one or more instructions which, when executed by one or more processors, cause, at least in part, an apparatus to cause, at least in part, an authentication of at least one user at an embedded system. The apparatus is also caused to cause, at least in part, an association of the at least one user with at least one cloud account associated with the embedded system. The apparatus is further caused to cause, at least in part, a registration of one or more devices associated with the at least one user to the at least one cloud account. The apparatus is also caused to cause, at least in part, a synchronization of at least one function, data associated with the at least one function, or a combination thereof among the at least one embedded system, the one or more devices, or a combination thereof based, at least in part, on the registration.

According to another embodiment, an apparatus comprises means for causing, at least in part, an authentication of at least one user at an embedded system. The apparatus also comprises means for causing, at least in part, an association of the at least one user with at least one cloud account associated with the embedded system. The apparatus further comprises means for causing, at least in part, a registration of one or more devices associated with the at least one user to the at least one cloud account. The apparatus also comprises means for causing, at least in part, a synchronization of at least one function, data associated with the at least one function, or a combination thereof among the at least one embedded system, the one or more devices, or a combination thereof based, at least in part, on the registration.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of synchronizing a function among an embedded system and/or one or more devices, according to one embodiment;

FIG. 5 is a flowchart of a process for causing a synchronization of recommendation to linked devices and/or embedded system, according to one embodiment;

FIG. 9 is a diagram that represents a scenario wherein the synchronization platform 109 consumes at least one route segment, according to one example embodiment;

FIG. 10 is a diagram that represents a scenario wherein the synchronization platform 109 consumes speed of road matrix, according to one example embodiment;

DESCRIPTION OF SOME EMBODIMENTS

Figure 1B:
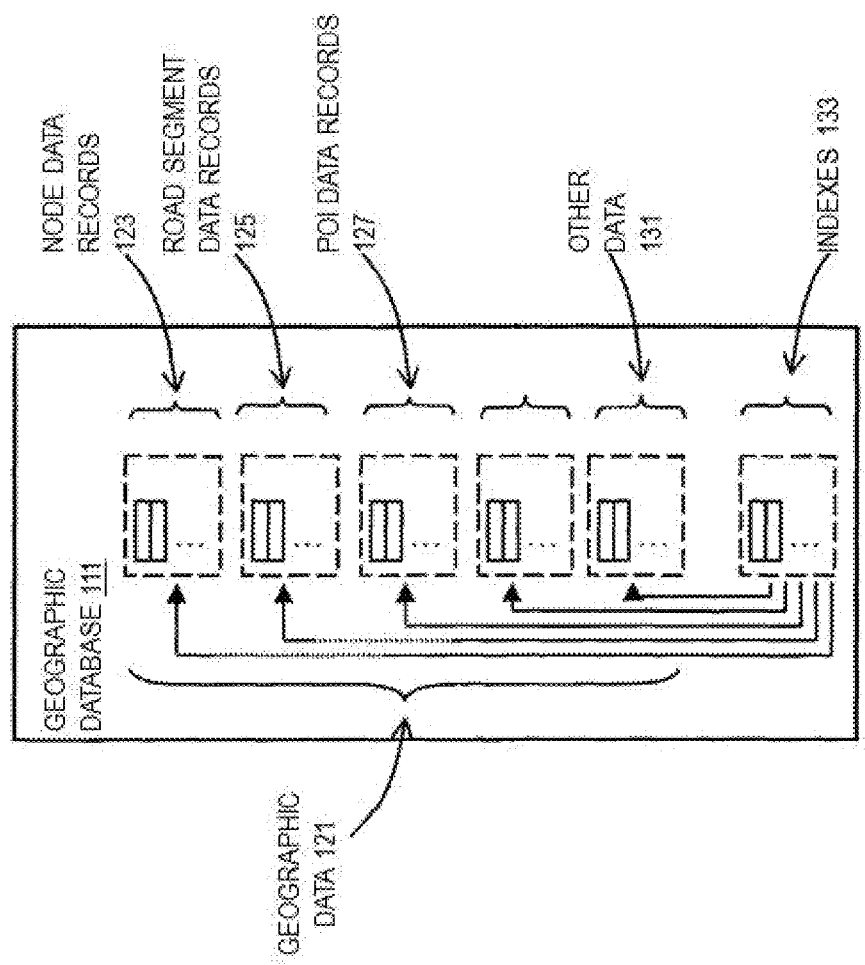
FIG. 1B is a diagram of the geographic database 111 of system 100, according to exemplary embodiments.

Examples of a method, apparatus, and computer program for synchronizing a function among an embedded system and/or one or more devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of synchronizing a function among an embedded system and/or one or more devices, according to one embodiment. Navigational services have gained ubiquitous adoption by users, and users regularly rely on routing applications and corresponding services in their mobile device and/or embedded system during their travel. However, unreliability in terms of sharing of content amongst different clients of an automotive system has contributed to negative user experience.

To address this problem, a system 100 of FIG. 1A introduces the capability to synchronize a function among an embedded system and/or one or more devices. One area of interest has been improving the quality of travel for one or more users by development of services to provide real-time exchange of content between different clients of the automotive system. As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 and/or the embedded system 135 has connectivity to the synchronization platform 109 via the communication network 107. In one embodiment, the synchronization platform 109 performs one or more functions associated with synchronizing a function among an embedded system 135 and/or one or more devices, according to one embodiment.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101 and/or embedded system 135, such as mapping application, location-based service applications, navigation applications, content provisioning services, camera/imaging application, media player applications, social networking applications, calendar applications, and the like. In one embodiment, one of the applications 103 at the UE 101 and/or embedded system 135 may act as a client for the synchronization platform 109 and perform one or more functions associated with the functions of the synchronization platform 109 by interacting with the synchronization platform 109 over the communication network 107.

By way of example, the sensors 105 may be any type of sensor. In certain embodiments, the sensors 105 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., information on road attribute can be populated by highly assisted vehicles that have cameras and image recognition techniques), an audio recorder for gathering audio data, velocity sensors, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lanes or roadways, the presence of other vehicles, pedestrians, traffic lights, road features (e.g., curves) and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one UE 101 associated with the at least one vehicle and/or embedded system 135.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the synchronization platform 109 may be a platform with multiple interconnected components. The synchronization platform 109 may include multiple servers, intelligent networking devices, computing devices, components and corresponding software for synchronizing a function among an embedded system 135 and/or one or more devices. In addition, it is noted that the synchronization platform 109 may be a separate entity of the system 100, a part of the one or more services 115a-115n (collectively referred to as services 115) of the services platform 113, or included within the UE 101 and/or the embedded system 135 (e.g., as part of the applications 103).

In one embodiment, the synchronization platform 109 may send current active routes to all linked devices and/or embedded system 135. The current active routes may be customized based on the type or context of the devices and/or embedded system 135. In one scenario, any changes in road segments (e.g., inactivated used road links) may be promptly synced to plurality of linked devices. In another embodiment, the synchronization platform 109 may detect cancellation of car navigation before a destination, whereupon navigation in other synced devices may be initiated.

In one embodiment, the synchronization platform 109 may store frequently used route segments, and may list it to other synced devices. In one scenario, the synchronization platform 109 may detect that a user is in the vehicle, and may determine that the user will be navigating via the embedded system 135 rather than the UE 101. Then, the synchronization platform 109 may initiate navigation from the vehicle location as a representation of user location. In another embodiment, the synchronization platform 109 may detect a user stepping out of a vehicle, whereupon the synchronization platform 109 activates guidance in UE 101 from the user location and takes the user to another active waypoint.

In one embodiment, the synchronization platform 109 avoids duplication of data and removes any type of inconsistent data. In one scenario, if synchronization fails or a connection is lost in the middle of synchronization, all the data will be cleaned and ignored by the application.

In one embodiment, the synchronization platform 109 manages one or more of the following objects:

| Property Name | Type | Description |
|---|---|---|
| clientId | string | this field is used by a SCBE client to persist the local id for the object |
| createdTime | integer | When the object was created. Always set by the system. |
| creatorId | string | Here Account ID of the creator of the object OR __scbe. Set by the system. |
| id | string | Identifier, unique within the type space. If 'required' is false, SCBE provides random ID; if 'required' is true, client application may supply ID. |
| type | string | object schema |
| updatedTime | integer | When the object was last modified. Always set by the system. |

In one embodiment, for initial sync the synchronization platform 109 may only sync objects that are not deleted (object.deleted==false). Further, the synchronization platform 109 may store the time of the sync. In one example embodiment, the synchronization platform 109 may determine an active route (e.g., route driven frequently), then sync it to the LTE 101, the embedded system 135, or a combination thereof. Then, the active routes may be available in the at least one vehicle and the UE 101. In another embodiment, with a local cache the synchronization platform 109 may use the time of the last sync to sync only those items that have changed since the last sync.

In one embodiment, the synchronization platform 109 performs a sorting of one or more routes. In one scenario, the synchronization platform 109 may implement the route-hash function to identify equal routes. Equal routes do not trigger a new object to be created, for example, recent routes or favorite routes. Instead the original object should be modified. The route-hash function herein below checks whether the placeId and the transport mode for all waypoints (except the origin) are the same and whether their order is same:

```
// calculate unique waypoint hash
function calculateHash(route){
    // New algorithm specification taking into account modality mode
    return md5(Array.map(route.connections, function(conn){
        return conn.mode + conn.placeId;
    }).join(""));
}
```

In another scenario, the synchronization platform 109 may implement auto-loc hash function to calculate a unique id for a specific geo location that can be used to determine whether two locations are equal. This is used to calculate the place-id values for geo locations:

```
function createAutoLocId(destination) {
    if (!destination || !destination.position) {
        return ""; }
    var lat = destination.position.latitude;
    var lon = destination.position.longitude;
    i f(!lat || !lon) {
        return "";
    }
    var key = "";
    var fields = [lat.toFixed(5), lon.toFixed(5)];
    if (destination.title) {
        fields.push(destination.title);
    }
    key = fields.join(",")
    key = Qt.btoa(key);
    key = "auto-loc" + key;
    return key;
}
```

The following table shows the functionality of the application and the list which they are used for sorting:

| Data in App | Sorting type | Objects | Fields | Comment |
|---|---|---|---|---|
| Favorites | A-Z/Z-A | MyCarRoute | Destination-> name | Use the name field of the destination-MyCarPlace to determine the "name" of the route. |
|  |  | MyCarPlace | name |  |
|  | Most Used | MyCarRoute | useFrequency |  |
|  |  | MyCarPlace | visitFrequence |  |
|  | Nearest | MyCarPlace | location | Calculate Distance from current position to give location in Object |
|  |  | MyCarRoute | Destination-> location | Calculate Distance from current position to location of Destination object of current Route |
| Recents | A-Z/Z-A | MyCarRoute | Destinations-> name | Use the name field of the destination-MyCarPlace to determine the "name" of the route. |
|  |  | MyCarPlace | name |  |
|  | Last Used | MyCarRoute | lastTimeUsed | May be updated when the user calculates the route (setAsDestination). In addition the lastTimeUsed-field of the MyCarPlace referenced in the destination field may be updated as well |

| Data in App | Sorting type | Objects | Fields | Comment |
|---|---|---|---|---|
| | | MyCarPlace | lastTimeUsed | May be updated when the user calculates the route where this place is set as destination(setAsDestination) |
| | Nearest | MyCarPlace | location | Calculate Distance from current position to give location in Object |
| | | MyCarRoute | Destination-> location | Calculate Distance from current position to location of Destination object of current Route |
| Shared | A-Z/Z-A | MyCarPlace | name | |
| | Last Used | MyCarPlace | lastTimeUsed | When the user creates a route the myCarPlace acting as the destination may be updated as well. |
| | Nearest | MyCarPlace | location | Calculate Distance from current position to give location in Object |

In one embodiment, the synchronization platform 109 may create a route from one or more recent routes. In one scenario, the at least one first entry of the connections list in the MyCarRoute object may be replaced by the current location. If current location is not available the route cannot be calculated. In another scenario, the car location may be updated with the current car location as specified in the MyCar object. If the recent route includes a waypoint indicating that the waypoint represents the car position, the waypoint representing the car position may be identified by comparison. In a further scenario, if the new car position along with the new user location creates a corrupted route, such route cannot be calculated. If the distance to car position is too far, the user may be notified and the route may not be stored.

Pick route from recent:
  When set to active;
  Increment useFrequency;
  Set connection status of each item to active;
  Set RouteStatus to active;
  Set Departure Time to current time/User defined date;
  Recalculate each connection.
When creating or using an edited route:
  Calculate hash of current route;
  If hash exists in previous routeObjects do not create new Object but modify existing;
  Set Origin.

In one embodiment, the synchronization platform 109 may handle corrupted, faulty and unnecessary data. In one scenario, the following sections list cases of faulty or corrupted data that the synchronization platform 109 deals with:

(a) Active Segments before inactive segments:
  Under certain circumstances there may active segments before inactive segments. In such cases the synchronization platform 109 has to set all active segments before the inactive one to "inactive":

```
Int firstActiveIndex = getIndexFirstActiveWaypoint( );
Int lastInactiveIndex = getIndexLastInactiveWaypoint( );
If (firstActiveIndex < lastInactiveIndex) {
For (int x = firstActiveIndex; x < lastInactiveIndex;x++) {
getWaypoint(x).setInactive( );
}
```

(b) Identical RouteIDs:
  The RouteId (not route.id) may be unique. If there are multiple routes with the same route id the synchronization platform 109 may delete all but the latest one. In one scenario, all routes may not have RouteId. However, RouteID for one or more routes may be calculated on the fly.

```
If (route1.routid == route2.routeId) {
If (route1.lastTimeUsed<= route2.lastTimeUsed) {
Route1.deleted = true;
} else {
route2.deleted = true;
}
```

(c) Missing/Deleted Places:
  In case a route is referencing non-existent/deleted MyCarPlaces the route may be deleted.

```
For (int x = 0 ; x < route.connections.length; x++) {
If(route.connections[x].destination==""||
!doesMyCarPlaceExist(route.connections[x].destination) {
Route.deleted = true;
}
```

In one embodiment, the synchronization platform 109 may execute a scheduled check for outdated MyCarRoute objects, and for unnecessary MyCarPlaces. In one scenario, the synchronization platform 109 may delete MyCarRoute if there are more than 100 routes, or the route is not among the last 100 routes used by the user.

```
Route[ ] routes= getAllRoutesForUser( );
If (routes.length> 100) {
//sort so that routes[0].lastTimeUsed > routes[1].lastTimeUsed
SortRoutesLastUsedFirst(routes);
For (int x = 100; x < routes.length; x++){
routes[x].deleted = true
}
```

In another scenario, the synchronization platform 109 may delete MyCarPlaces if it is not referenced from a route, it is not a favorite, it is not a home, it has not been updated/created in the last hour, or a combination thereof.

```
Foreach(MyCarPlace place: getAllPlaces( )) {
  If (place.category == HOME || place.favoritePlaceID != "") {
  Continue;
  }
  If (isReferencedbyRoute(place)) {
  Continue;
  }
  if (place. updatedTime > getCurrentTimeInSec( ) - 3600) {
  Continue;
  }
  myCarPlace.deleted = true;
}
```

In one embodiment, the geographic database 111 may store location information (e.g., road length, road breadth, etc.), probe data for one or more locations (e.g., traffic density information), or a combination thereof. In another embodiment, the geographic database 111 may store favorite routes, recent routes, or a combination thereof for one or more users. The information may be any multiple types of information that can provide means for aiding in the content provisioning and sharing process. In another embodiment, the geographic database 111 may be in a cloud and/or in a vehicle (e.g., cars) and/or a mobile device (e.g., phone).

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the embedded system 135, the synchronization platform 109 and the content provider 117 to supplement or aid in the processing of the content information.

By way of example, the services 115 may be an online service that reflects interests and/or activities of users. The services 115 allow users to share location information (e.g., speed information), activities information (e.g., travel plans), contextual information, historical user information and interests within their individual networks, and provides for data portability. The services 115 may additionally assist in providing the synchronization platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the synchronization platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. In one embodiment, the content provider 117 may also store content associated with the UE 101 and/or embedded system 135, the synchronization platform 109, and the services 115 of the services platform 113. In another embodiment, the content provider 117 may manage access to a central repository of data, and offer a consistent, standard interface to data, such as, attributes, probe data, and traffic sign information for one or more locations.

In one embodiment, the vehicle 129 may be a manually driven vehicle, a semi-autonomous vehicle, a fully autonomous vehicle, or a combination thereof. The vehicle 129 comprises of application 103, sensors 105, and embedded system 135. In one embodiment, the embedded system 135 may be an in-vehicle navigation system that can perform navigation-related functions. In one scenario, the embedded system 135 in the at least one vehicle may run independently from the operating system. In another scenario, the embedded system 135 may be any other system associated with the overall syncing scheme or system 100.

By way of example, the UE 101, the synchronization platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road segment data records 125 and the node data records 123 represent a road network, such as used by vehicles cars, and/or other entities. Alternatively, the geographic database 111 can contain path segment and node data records or other data that represent pedestrian paths or areas in addition to or instead of the vehicle road record data, for example.

The travel segment and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101, embedded system 135) to provided navigation-related functions. For example, the geographic database 111 can be used with the UE 101 and/or embedded system 135 to provide an end user with navigation features. In such a case, the geographic database 111 can be downloaded or stored on the UE 101 and/or embedded system 135, such as in the applications 103, or the UE 101 and/or embedded system 135 can access the geographic database 111 through a wireless or wired connection (such as via a server and/or the communication network 107), for example.

In one embodiment, the end user device or UE 101 can be a personal navigation device (PND), a portable navigation device, a cellular telephone, a mobile phone, a personal digital assistant (PDA), a watch, a camera, a computer, and/or other device that can perform navigation-related functions, such as digital routing and map display. In another embodiment, the navigation device UE 101 can be a cellular telephone. An end user can use the device UE 101 for navigation functions, for example, location map updates.

Figure 2:
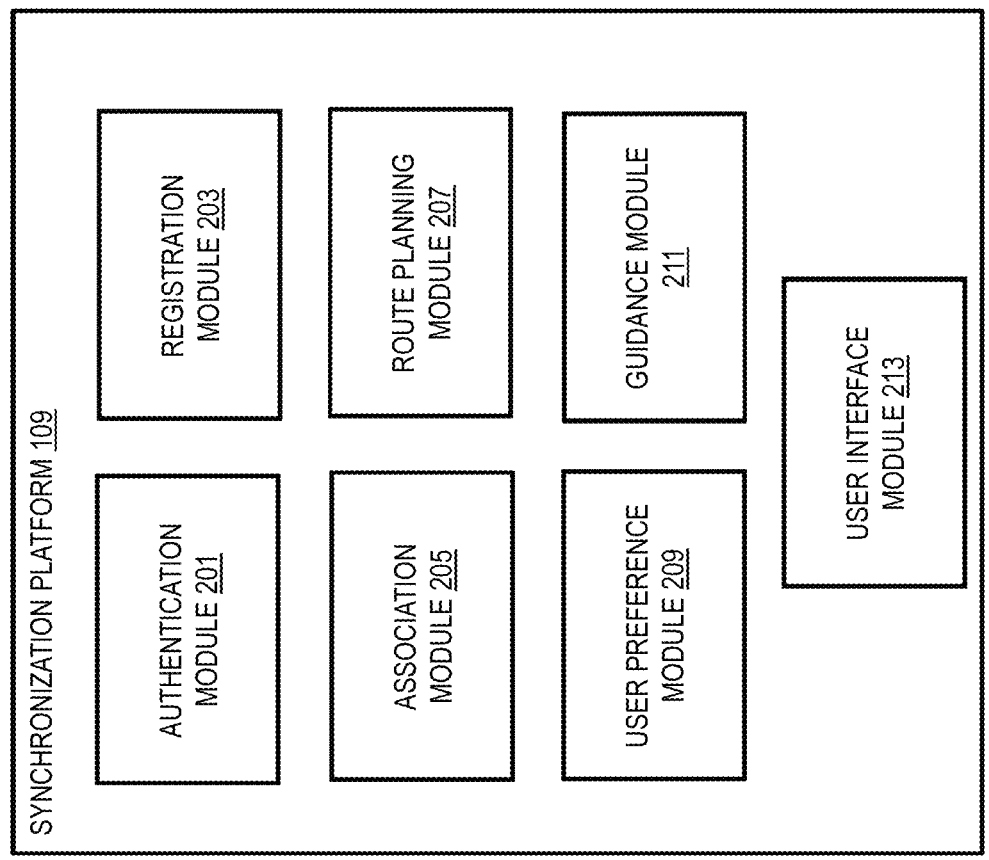
FIG. 2 is a diagram of components of the synchronization platform 109, according to one embodiment.

FIG. 2 is a diagram of components of the synchronization platform 109, according to one embodiment. By way of example, the synchronization platform 109 includes one or more components for synchronizing a function among an embedded system 135 and/or one or more devices. It is contemplated that the functions of these components may be combined in one or more components or performed by other components of equivalent functionality. In this embodiment, the synchronization platform 109 includes, but not restricted to, an authentication module 201, a registration module 203, an association module 205, a route planning module 207, a user preference module 209, a guidance module 211, and a user interface module 213.

In one embodiment, the authentication module 201 authenticates one or more users for interaction with the embedded system 135. In one embodiment, the authentication process performed by the authentication module 201 may include receiving and validating a login name and/or user identification value as provided or established for a particular user during a subscription or registration process with the service provider. The login name and/or user identification value may be received as input provided by the user from the user device 101 or other device via a graphical user interface to the synchronization platform 109. Alternatively, the login process may be performed through automated association of profile settings maintained with an IP address, a carrier detection signal of a user device, mobile directory number (MDN), subscriber identity module (SIM) (e.g., of a SIM card), radio frequency identifier (RFID) tag or other identifier.

In one embodiment, the registration module 203 may register at least one UE 101, actual communication identifiers associated with at least one UE 101, or a combination thereof. In one scenario, actual communication identifiers include email address, phone number, social media information, or a combination thereof associated with at least one user of the at least one UE 101. In one embodiment, the registration module 203 may trigger at least one specific configurable action by causing a synchronization of data between the one or more registered devices and the embedded system 135. In one example embodiment, the synchronization platform 109 may selectively route communications from at least one embedded system 135 to the at least one registered UE 101 based, at least in part, on device capability information, resource availability information, user configuration, or a combination thereof.

In one embodiment, the association module 205 may add at least one user to the one or more vehicle from the at least one embedded system 135 connected with the vehicle. In one scenario, a user may log into his/her account via his/her UE 101 and/or an embedded system 135 by using special application identification and a special authentication daemon. Following a successful login the user may be automatically added to the user group for the one or more vehicles. In one scenario, a user may log into his/her account from at least one UE 101 and/or an embedded system 135, whereupon at least one vehicle linked to the user account may be selected. In one example embodiment, if there is only one linked vehicle, this vehicle may be chosen automatically and is used for the vehicular position. In another example embodiment, if there are multiple vehicles linked to the user account, the association module 205 may select the most recently added vehicle. In another embodiment, the association module 205 may send an error notification (e.g., "no vehicles found") if the user tries to login from a UE 101 and/or an embedded system 135 before any vehicles are linked. In one scenario, if a user logs-in to a vehicle that is already created in the cloud, it will not be recreated, but instead used directly.

In one embodiment, the route planning module 207 may search for location information towards a particular destination and may share the location information with one or more users. In one scenario, at least one user may plan a trip towards a particular destination using his/her UE 101 and/or embedded system 135, and the planned trip may be displayed on all platforms. In another embodiment, the route planning module 207 may store information to create a similar route at a later time. The information includes:
  Start/end point of each segment;
  State of the different segments: inactive/active;
  Mode of transport for each segment;
  Route options for each segment based on mode of transport; and
  Any additional parameters, for example, start date needed for an active route.

In a further embodiment, the route planning module 207 may determine that a route comprises of walk segments and/or drive segments, whereupon the route planning module 207 may display only the drive segment in the embedded system 135 (i.e., the embedded system 135 do not show the user location as part of the route). Once the route is complete, the route planning module 207 may not set the route as inactive because it can be reused by the companion application.

In one embodiment, the route planning module 207 may process most recent places used as a destination and/or waypoint when calculating a route. The route planning module 207 may sort the recent entries and destinations (a) alphabetically based on title; (b) reverse alphabetically based on title; (c) most recently used as first; and (d) most often used as first. In one example embodiment, a user may search for a place and set it as a destination. Once the user has successfully calculated a route by selecting a destination it may be stored as a recent route. However, if the route already exists, the existing entry may be raised and displayed in the top of the list. For example, the existing entry is modified so that it is shown as the first recent place, a route may not be listed twice to avoid redundancy. On the other hand, if the place is not a destination but a waypoint, it may be stored as a recent waypoint upon calculation of the route. Once added and/or modified the order of the recent list may show the route as most recent entry followed by the recent place. In another embodiment, the route planning module 207 may calculate a route from a recent route. The newly calculated route may use the user's current location as well as the current vehicle location instead of the original positions used when the recent route was calculated. The route planning module 207 while calculating a new route does not create a new entry for a recent route but instead the original entry for the recent place should be shown first, assuming the list is sorted by most recent entry shown first.

In one embodiment, user preference module 209 may store and/or add one or more destinations, one or more routes, or a combination thereof based, at least in part, on user choices. In one scenario, the user preference module 209 may calculate route based on favorite routes and location of the user. Favorites are special entries that the user likes to remember, and comprises of location information, title information etc. In another embodiment, the user preference module 209 may sync the client where the favorite was created, as a result of which other clients may be able to list the favorite destination as well. In one scenario, a user may search for an address and add it as a favorite, thereafter the favorite address may be visible on all clients. In a further embodiment, the user preference module 209 may remove a favorite item based on user request. In one scenario, if the favorite item is identical to the home address, then the home address may be removed.

In one embodiment, the user preference module 209 may allow regulated editing of favorite items based on user request. In one scenario, a user may edit the title of the favorite item, however the user may not edit location information. Further, the title may be synced between different devices. In another embodiment, the user preference module 209 may allow storing of recent place as a favorite. In one scenario, a user may store a recent place as a favorite. This does not change the recent place entry. In another embodiment, the user preference module 209 may create home favorite list to allow one or more users to create a synced object for quick access. The home favorite list may be shown separately from the favorite list and can be accessed with just one click. In one scenario, a user may be able to set a location as his/her home address, creating a home address may also create a favorite entry containing the same information. The home address may be synced between clients. In another embodiment, the user preference module 209 may allow deletion of home address. In one scenario, a user may delete home address, whereupon the client behaves as if the home address was never set. The deleted home address may be synced on all clients so that it is deleted everywhere. Further, if the home address is identical to a favorite object the favorite object may be removed. In a further embodiment, the user preference module 209 may store home address as part of the recent list or if it already exists the entry may be updated to reflect the recent usage.

In one embodiment, the guidance module 211 may update the routes during navigation to reflect the status of the different route segments. A route segment is active when a user has not reached the destination of that segment. A route segment is active when the user reaches the segment. Further, all the route segments before the one that was just completed needs to be set as inactive. This may occur if a user decides to skip a segment to drive to a later waypoint. In addition, if there are no more active segments the whole route may be set as inactive. In another embodiment, the guidance module 211 may acknowledge short term parking and guide a user back to the car. In one scenario, a user may briefly park his/her car during a trip. The guidance module 211 may guide the user back to the parked car without impacting the calculated route towards a particular destination. In another scenario, if a vehicle is parked close to a destination or a waypoint, the guidance module 211 may guide the user to the final destination and/or waypoint. The guidance does not change the defined route but rather allows the user to get back on this route.

In one embodiment, the user interface module 213 enables presentation of a graphical user interface (GUI) for displaying a presentation of a calculated route and/or a navigation guidance to the at least one UE 101, embedded system, or a combination thereof. The user interface module 213 employs various application programming interfaces (APIs) or other function calls corresponding to the applications 103 of UE 101 and/or the embedded system 135, thus enabling the display of graphics primitives such as menus, buttons, data entry fields, etc., for generating the user interface elements. In a further embodiment, the user interface module 213 may cause an interfacing of the navigation guidance information with one or more users to include, at least in part, the one or more annotations, audio messages, voice messages, or a combination thereof.

The above presented modules and components of the synchronization platform 109 can be implemented in hardware, firmware, software, or a combination thereof. Though depicted as a separate entity in FIG. 1A, it is contemplated that the synchronization platform 109 may be implemented for direct operation by respective UE 101s. As such, the synchronization platform 109 may generate direct signal inputs by way of the operating system of the UE 101 and/or the embedded system 135 for interacting with the applications 103. In another embodiment, one or more of the modules 201-213 may be implemented for operation by respective UE 101s, as a synchronization platform 109, or combination thereof. Still further, the synchronization platform 109 may be integrated for direct operation with the services 115, such as in the form of a widget or applet, in accordance with an information and/or subscriber sharing arrangement. The various executions presented herein contemplate any and all arrangements and models.

Figure 3:
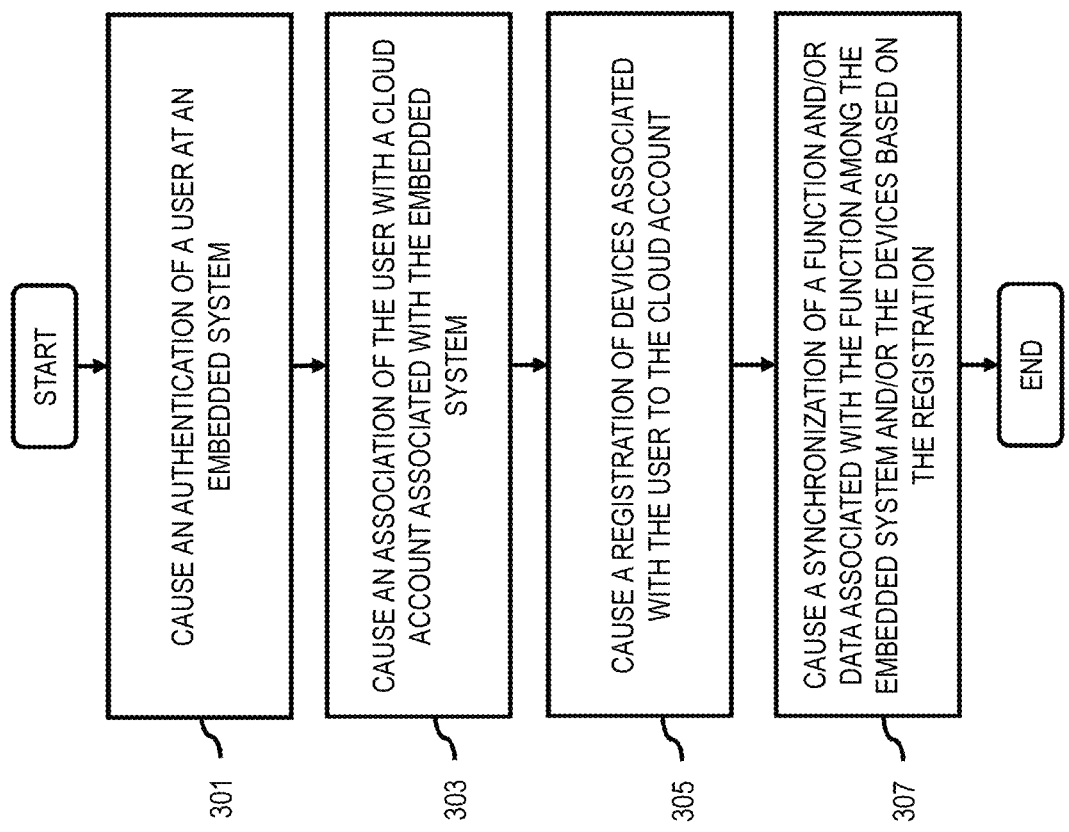
FIG. 3 is a flowchart of a process for synchronizing a function among an embedded system and/or one or more devices, according to one embodiment.
Figure 23:
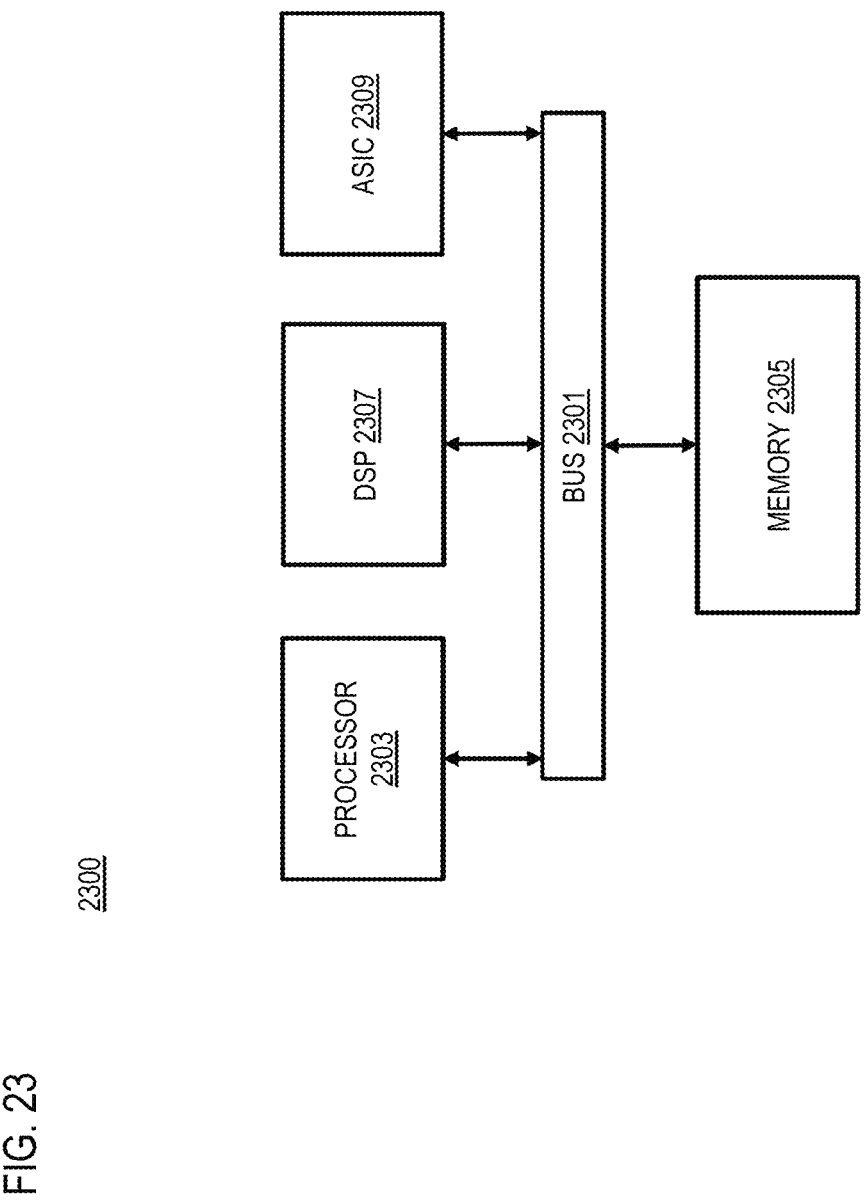
FIG. 23 is a diagram of a chip set that can be used to implement an embodiment of the invention.

FIG. 3 is a flowchart of a process for synchronizing a function among an embedded system and/or one or more devices, according to one embodiment. In one embodiment, the synchronization platform 109 performs the process 300 and is implemented in, for instance, a chip set including a processor and a memory as shown in FIG. 23.

In step 301, the synchronization platform 109 may cause, at least in part, an authentication of at least one user at an embedded system. In one embodiment, the authentication includes predefined values, a preset username and password, user identification, device identification, other authentication mechanisms, or a combination thereof. In one scenario, the synchronization platform in 109 implements an authentication mechanism for granting access to at least one user to at least one UE 101, at least one embedded system 135, or a combination thereof.

In step 303, the synchronization platform 109 may cause, at least in part, an association of the at least one user with at least one cloud account associated with the embedded system. In one scenario, the synchronization platform 109 may determine a successful login by at least one user. Then, the synchronization platform 109 may associate at least one user with a cloud account associated with the embedded system 135.

In step 305, the synchronization platform 109 may cause, at least in part, a registration of one or more devices associated with the at least one user to the at least one cloud account. In one scenario, one or more UE 101 associated with the at least one user may be registered with the cloud account upon successful login during the authentication process.

In step 307, the synchronization platform 109 may cause, at least in part, a synchronization of at least one function, data associated with the at least one function, or a combination thereof among the at least one embedded system, the one or more devices, or a combination thereof based, at least in part, on the registration. In one example embodiment, the synchronization platform 109 may determine status information for one or more route segments towards at least one destination. The status information may include an active route segment, an inactive route segment, a favorite route segment, a favorite destination, a recent route segment, a recent destination, or a combination thereof. Then, the synchronization platform 109 may cause a synchronization of transmission of the updated status information to a registered embedded system 135, registered devices (e.g., UE 101), or a combination thereof. Subsequently, the one or more updated route segment may be presented in the mapping user interface of the registered embedded system 135, registered devices, or a combination thereof.

Figure 4:
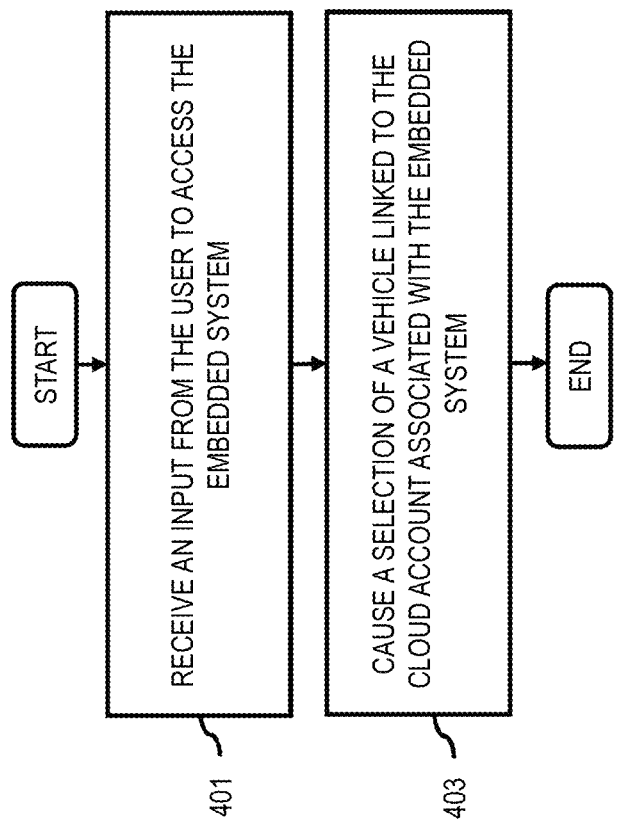
FIG. 4 is a flowchart of a process for selecting at least one vehicle linked to the cloud account associated with an embedded system, according to one embodiment.

FIG. 4 is a flowchart of a process for selecting at least one vehicle linked to the cloud account associated with an embedded system, according to one embodiment. In one embodiment, the synchronization platform 109 performs the process 400 and is implemented in, for instance, a chip set including a processor and a memory as shown in FIG. 23.

In step 401, the synchronization platform 109 may receive an input from the at least one user to access the embedded system. In one scenario, a user may enter his/her username and password obtained during the subscription or registration process to access the embedded system 135.

In step 403, the synchronization platform 109 may cause, at least in part, a selection of at least one vehicle linked to the cloud account associated with the embedded system. In one scenario, the synchronization platform 109 may select at least one newly added vehicle from the plurality of vehicles linked to the cloud account.

FIG. 5 is a flowchart of a process for causing a synchronization of recommendation to linked devices and/or embedded system, according to one embodiment. In one embodiment, the synchronization platform 109 performs the process 500 and is implemented in, for instance, a chip set including a processor and a memory as shown in FIG. 23.

In step 501, the synchronization platform 109 may determine that the at least one embedded system, the one or more devices, or a combination thereof is within at least one distance threshold from at least one waypoint. In one scenario, if a user parks his/her vehicle within the threshold limit before at least one waypoint, the synchronization platform 109 may propose certain recommendations.

In step 503, the synchronization platform 109 may process and/or facilitate a processing of location information, mapping information, or a combination thereof to generate a recommendation of at least one walking segment, at least one driving segment, at least one transport line, or a combination thereof. In one scenario, if a user parks his/her vehicle next to the destination the recommendation function remains inactive. In another scenario, the synchronization platform 109 may ascertain that the distance between the vehicle and the at least one waypoint is within the threshold limit. Then, the synchronization platform 109 may recommend at least one user to use a public transit or walk towards the destination.

In step 505, the synchronization platform 109 may cause, at least in part, a linking of the one or more devices, the embedded system, the cloud, or a combination thereof. In one scenario, routing information includes user location, vehicle location, way points, destination, different modes of transport, and so on. The synchronization platform 109 may sync the routing information across all clients (e.g., the synchronization platform 109 may push the routing information to UE 101 and/or the embedded system 135).

In step 507, the synchronization platform 109 may cause, at least in part, the synchronization of the recommendation among the at least one embedded system, the one or more devices, or a combination thereof for real-time transmission.

Figure 6:
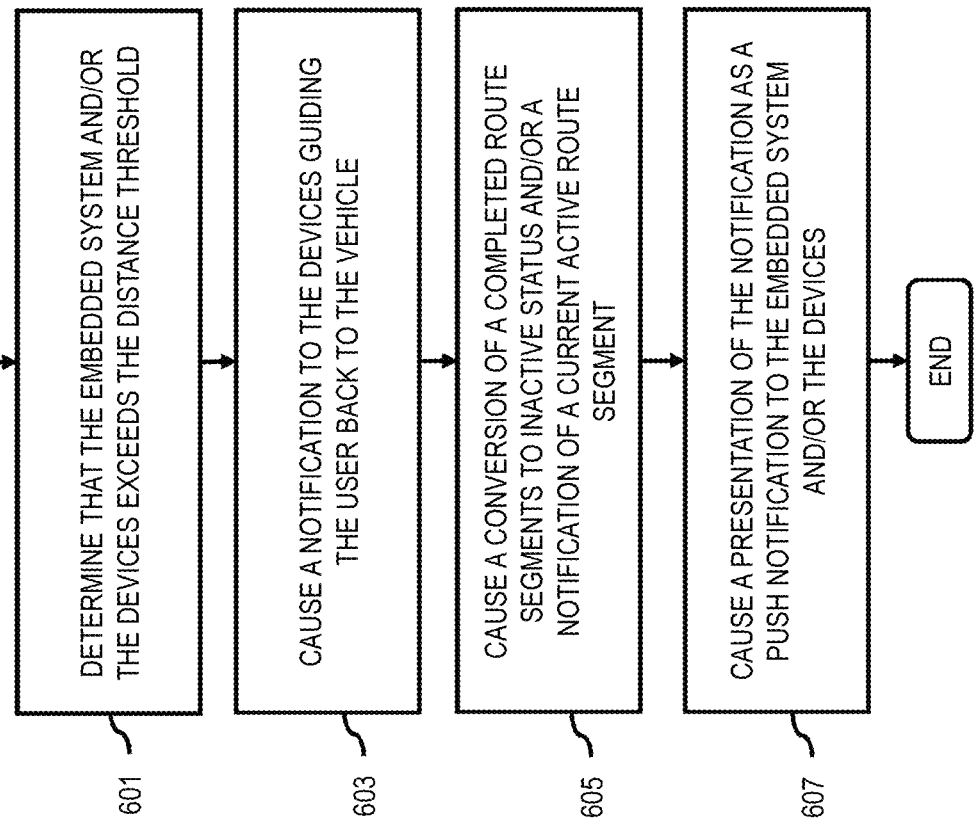
FIG. 6 is a flowchart of a process for providing one or more push notifications, according to one embodiment.

FIG. 6 is a flowchart of a process for providing one or more push notifications, according to one embodiment. In one embodiment, the synchronization platform 109 performs the process 600 and is implemented in, for instance, a chip set including a processor and a memory as shown in FIG. 23.

In step 601, the synchronization platform 109 may determine that the at least one embedded system, the one or more devices, or a combination thereof exceeds the at least one distance threshold.

In step 603, the synchronization platform 109 may cause, at least in part, a notification to the one or more devices guiding the at least one user back to the vehicle. In one example embodiment, a user stops and steps out of the car before the driving segment is over. Then, depending on user location, the synchronization platform 109 may reroute using the UE 101 or guide the user to get back into the car. In one scenario, the synchronization platform 109 may determine that the distance between the at least one user and the at least one waypoint is over the threshold limit. As a result, the synchronization platform 109 may guide the user back to his/her car, and recommend continuing in the driving segment.

In step 605, the synchronization platform 109 may cause, at least in part, a conversion of one or more completed route segments to inactive status, a notification of at least one current active route segment, or a combination thereof.

In step 607, the synchronization platform 109 may cause, at least in part, a presentation of the notification as at least one push notification to the at least one embedded system, the one or more devices, or a combination thereof. In one scenario, one or more notifications may be presented in a user interface element with drag and drop way points.

Figure 7:
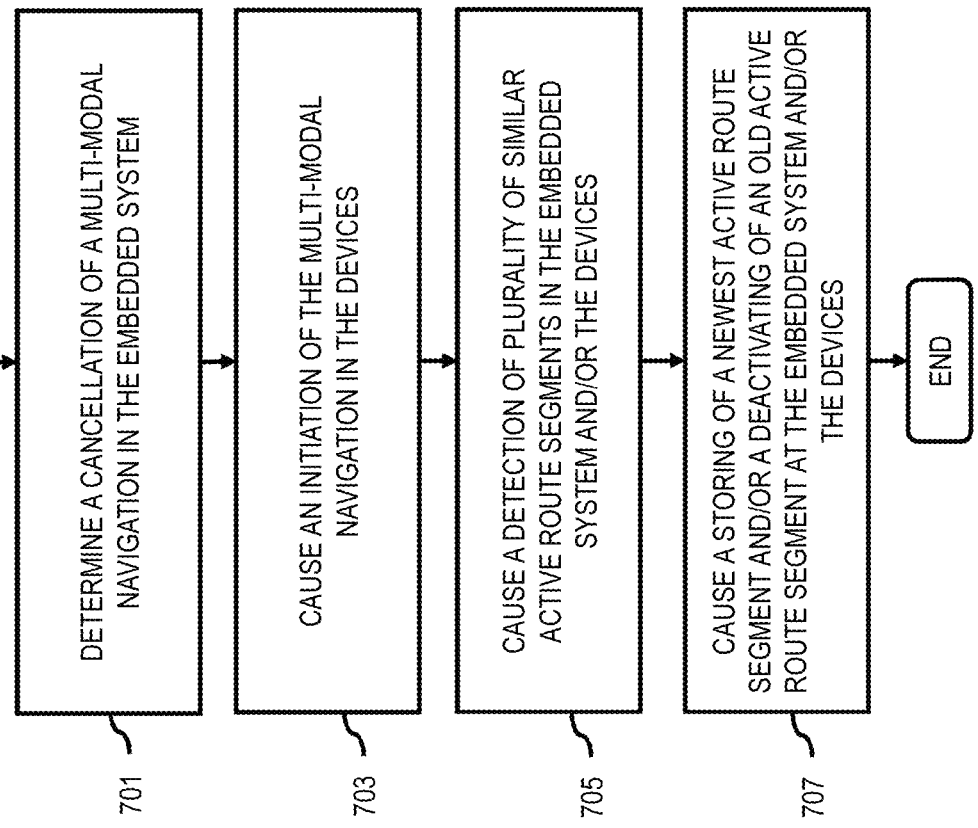
FIG. 7 is a flowchart of a process for initiating navigation in at least one other device, and/or selecting newest active route segment from plurality of similar active route segments, according to one embodiment.

FIG. 7 is a flowchart of a process for initiating navigation in at least one other device, and/or selecting newest active route segment from plurality of similar active route segments, according to one embodiment. In one embodiment, the synchronization platform 109 performs the process 700 and is implemented in, for instance, a chip set including a processor and a memory as shown in FIG. 23.

In step 701, the synchronization platform 109 may determine a cancellation of a multi-modal navigation in the at least one embedded system.

In step 703, the synchronization platform 109 may cause, at least in part, an initiation of the multi-modal navigation in the one or more devices. In one scenario, the synchronization platform 109 may determine that car navigation is cancelled before a destination has been reached. Then, the synchronization platform 109 may start using the navigation in at least one other registered UE 101 towards at least one destination.

In step 705, the synchronization platform 109 may cause, at least in part, a detection of plurality of similar active route segments in the at least one embedded system, the one or more devices, or a combination thereof.

In step 707, the synchronization platform 109 may cause, at least in part, a storing of a newest active route segment, a deactivating of at least one old active route segment, or a combination thereof at the at least one embedded system, the one or more devices, or a combination thereof. In one scenario, the synchronization platform 109 avoids storing plurality of similar active route. The synchronization platform 109 may save a single latest active route and may de-activate the other (e.g., older) similar active routes.

Figure 8:
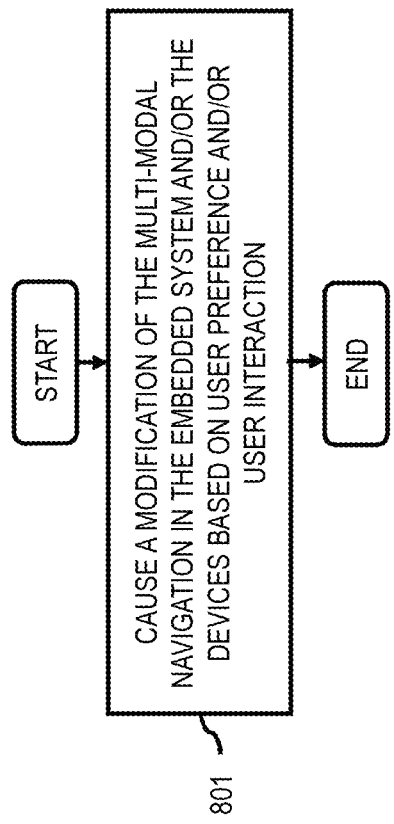
FIG. 8 is a flowchart of a process for modifying navigation based on user preference and/or user interaction, according to one embodiment.

FIG. 8 is a flowchart of a process for modifying navigation based on user preference and/or user interaction, according to one embodiment. In one embodiment, the synchronization platform 109 performs the process 800 and is implemented in, for instance, a chip set including a processor and a memory as shown in FIG. 23.

In step 801, the synchronization platform 109 may cause, at least in part, a modification of the multi-modal navigation in the at least one embedded system, the one or more devices, or a combination thereof based, at least in part, on user preference, user interaction, or a combination thereof. In one embodiment, the user interaction include, at least in part, a touch-based interaction with a mapping user interface associated with the at least one embedded system, the one or more devices, or a combination thereof. In one scenario, a user may select a route segment per his/her preference, whereupon the route segment may be added to the recent list. Then, the user may search for the route segment in the recent folder via his/her mobile companion. This process reduces reduce duplication.

FIG. 9 is a diagram that represents a scenario wherein the synchronization platform 109 consumes at least one route segment, according to one example embodiment. In one scenario, at least one route is broken into one or more segments, these segments may either be active or inactive. The synchronization platform 109 may detect and consume the active segment of the route. In one example embodiment, a user may enter and save at least one destination. Then, the route towards the final destination may start from the location of a user to the location of a vehicle, and from the location of the vehicle to the final waypoint. In another example embodiment, a route may comprise of a walk segment and a drive segment. The synchronization platform 109 may detect that a user is in the vehicle, and have started navigation towards an active route without using the walk segment. The synchronization platform 109 may determine that the user is no longer interested in the walk segments, and the walk segments may be rendered inactive. In one scenario, a user during a drive segment may use a UE 101 to navigate towards the next active waypoints, whereupon the synchronization platform 109 may check the status for previous segments within a route. Then, the mobile device may set previous route segments that were unused as inactive. In one example embodiment, at least one user starts driving in a drive segment and then parks the car before reaching the next waypoint. Then, the user takes out his/her UE 101 (e.g., a mobile device) to navigate to the next waypoint, whereupon the UE 101 detects that the vehicle location has changed. Then, while navigating to the next waypoint the UE 101 ignores the previous driving segments. Since the vehicle is not at the starting location, the UE 101 may calculate the distance to the next active waypoint towards the destination. However, if the distance is over the minimum threshold limit, the system may check for public transport as an option, if available, try to recommend public transport.

Figure 10:
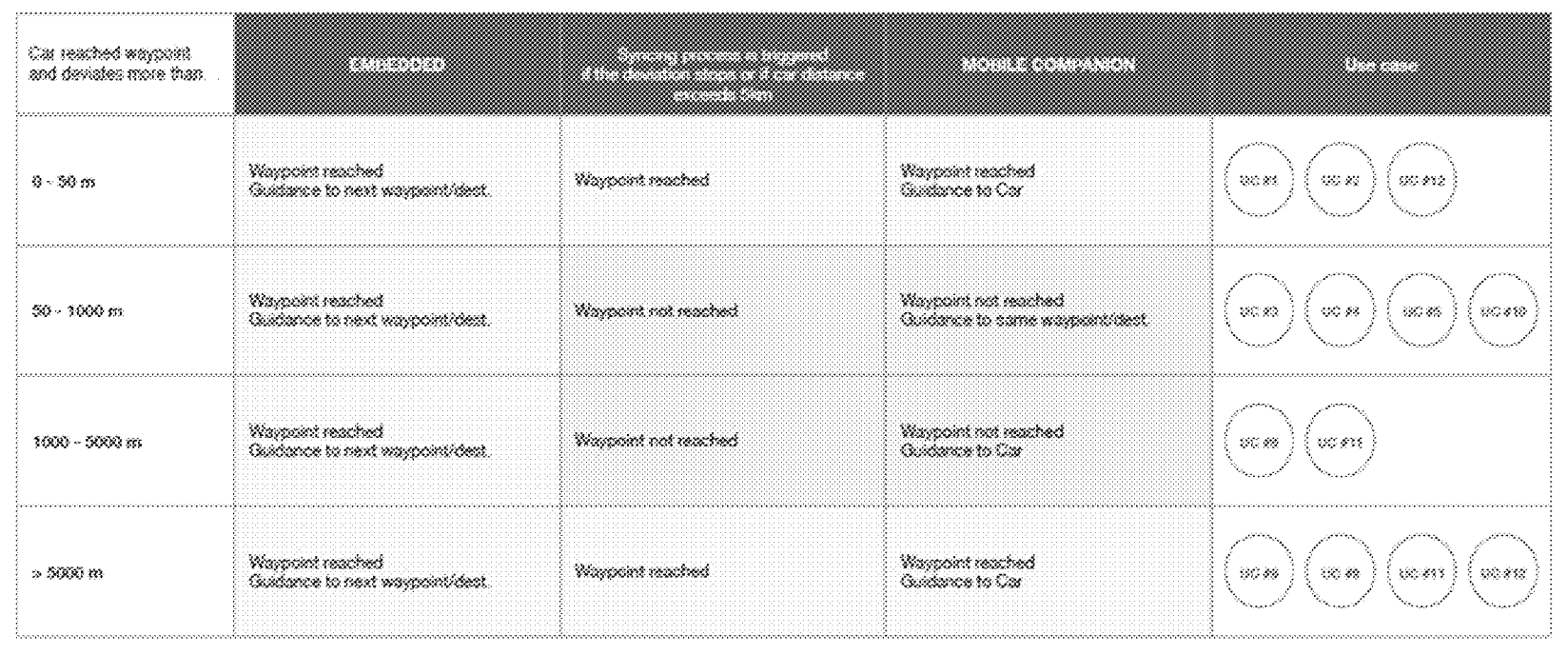

FIG. 10 is a diagram that represents a scenario wherein the synchronization platform 109 consumes speed of road matrix, according to one example embodiment. In one example embodiment, if a distance is beyond 5000 meters from the destination then the synchronization platform 109 may guide a user back to the car. In one scenario, if the next active waypoint is faster to reach by a public transit, then a public transit is proposed instead of a car. In another example embodiment, a user may park his/her car at a fuel station before reaching the waypoint. The user may use his/her UE 101 to navigate to the waypoint, whereupon the UE 101 may recommend the user to go back to the car, and travel conveniently to the next active waypoint. The reason also being there might not be a public transit available because a fuel station might be located nearby highways.

Figure 11:
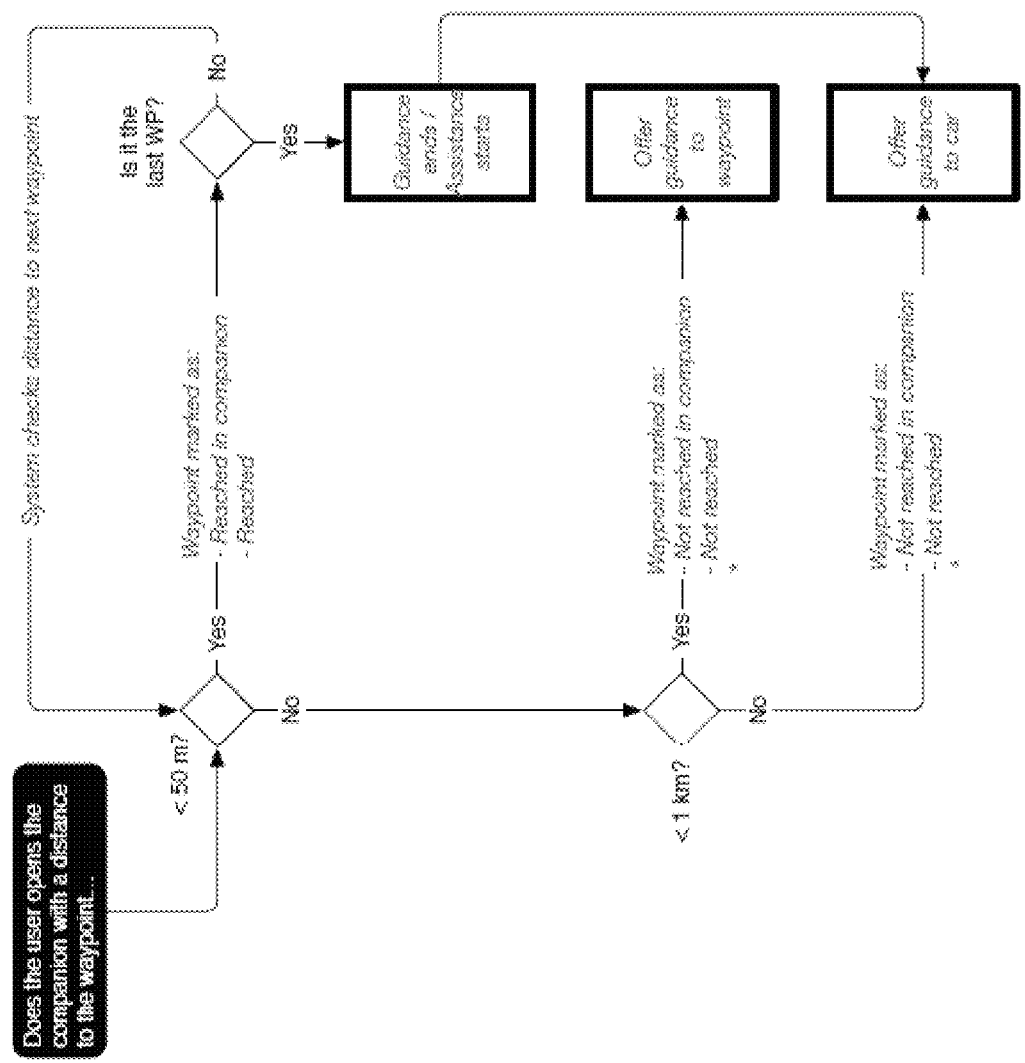
FIG. 11 is a flowchart that represents a scenario wherein the synchronization platform 109 guides a user to a waypoint and/or a vehicle based on distance information, according to one example embodiment.

FIG. 11 is a flowchart that represents a scenario wherein the synchronization platform 109 guides a user to at least one waypoint, at least one vehicle, or a combination thereof based, at least in part, on distance information, according to one example embodiment. In one scenario, the synchronization platform 109 may check the distance to the next waypoint from the location of the at least one user via his/her UE 101. If the distance is less than 50 meter, and the waypoint is the only remaining waypoint, the synchronization platform 109 may end the guidance and initiate assistance, whereby the at least one user is assisted towards his/her vehicle. In another embodiment, if the distance is more than 50 meter, the synchronization platform 109 may guide the at least one user towards the next waypoint.

Figure 12:
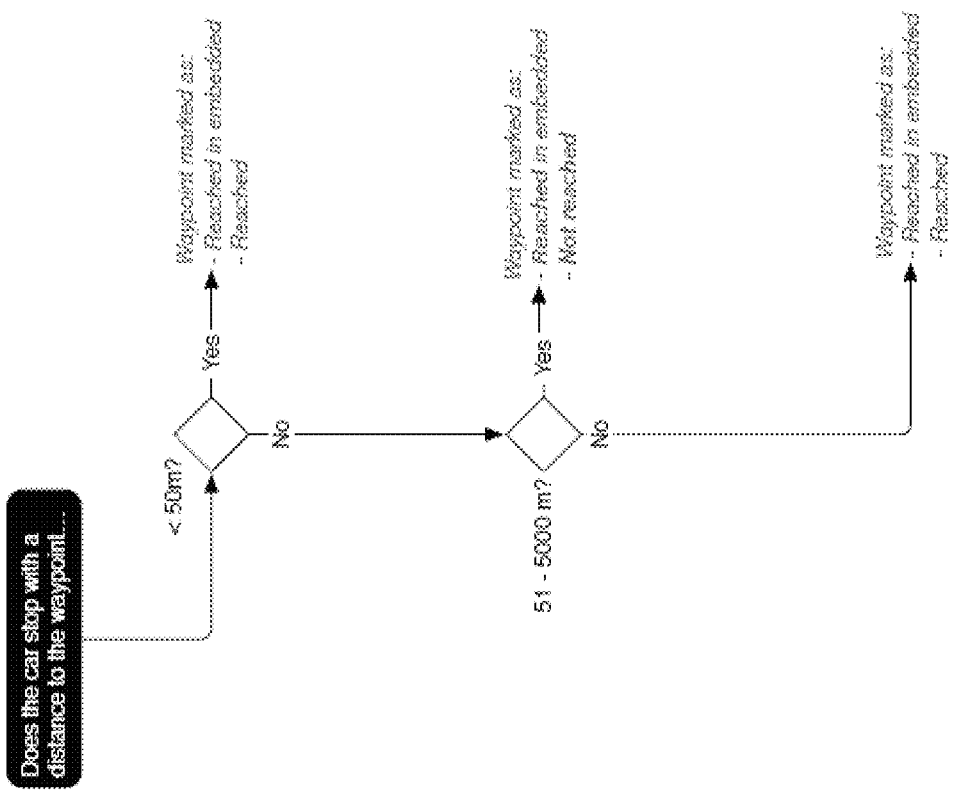
FIG. 12 is a flowchart that represents a scenario wherein the distance between the vehicle and the waypoint determines the system outcome, according to one example embodiment.

FIG. 12 is a flowchart that represents a scenario wherein at least one vehicle reaches a waypoint, and the distance between the vehicle and the waypoint determines the system outcome, according to one example embodiment. In one scenario, the synchronization platform 109 may check the distance to the next waypoint from the location of the at least one vehicle via its embedded system 135. The synchronization platform 109 may propose certain recommendations based on the distance information.

Figure 13:
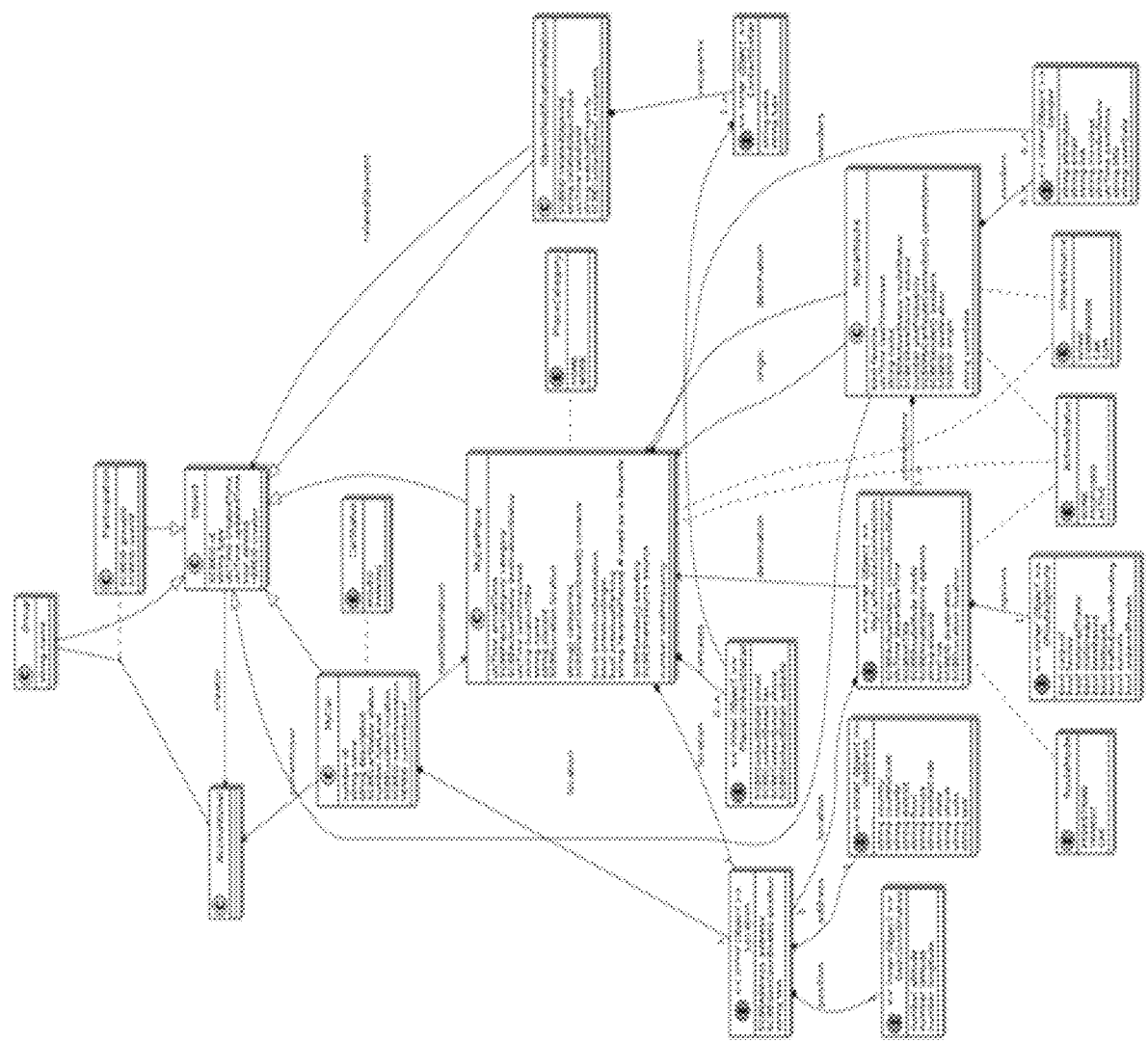
FIG. 13 is a flowchart that represents object hierarchy wherein information is exchanged between different clients of an automotive system, according to one example embodiment.

FIG. 13 is a flowchart that represents object hierarchy wherein information is exchanged between different clients of an automotive system, according to one example embodiment. The flowchart shows the objects used for sharing information and the manipulation of these objects. In one scenario, the flowchart comprises of the following objects:

(a) MyCar is the central object and represents the actual vehicle, its position and status;
(b) MyCarPlace are locations related to the vehicles, these can be favorites, recent destination, last parking positions and similar;
(c) MyCarRoute are favorite or recent routes containing ail the waypoints and modes of transport in between. In one scenario, MyCarPlace and MyCarRoute are also used to maintain the current status of the vehicle, e.g., its planned route or its future destinations;
(d) ObjectNotificationRelation objects are used to configure notifications on properties of other objects in the cloud—e.g., for sending an email when the estimated time of arrival of a MyCarRoute changes;
(e) The MyCar is the representation of the vehicle in the cloud;
(f) The MyCarRouteConnection are making up a MyCar-Route, by connecting the individual stopovers to a route;
(g) The location is shared among several other objects, mainly MyCar, MyCarPlace and the connection object inside the MyCarRoute;
(h) The group and participation objects are used for ensuring that a group of users has access to a specific MyCar object.

Figure 14:
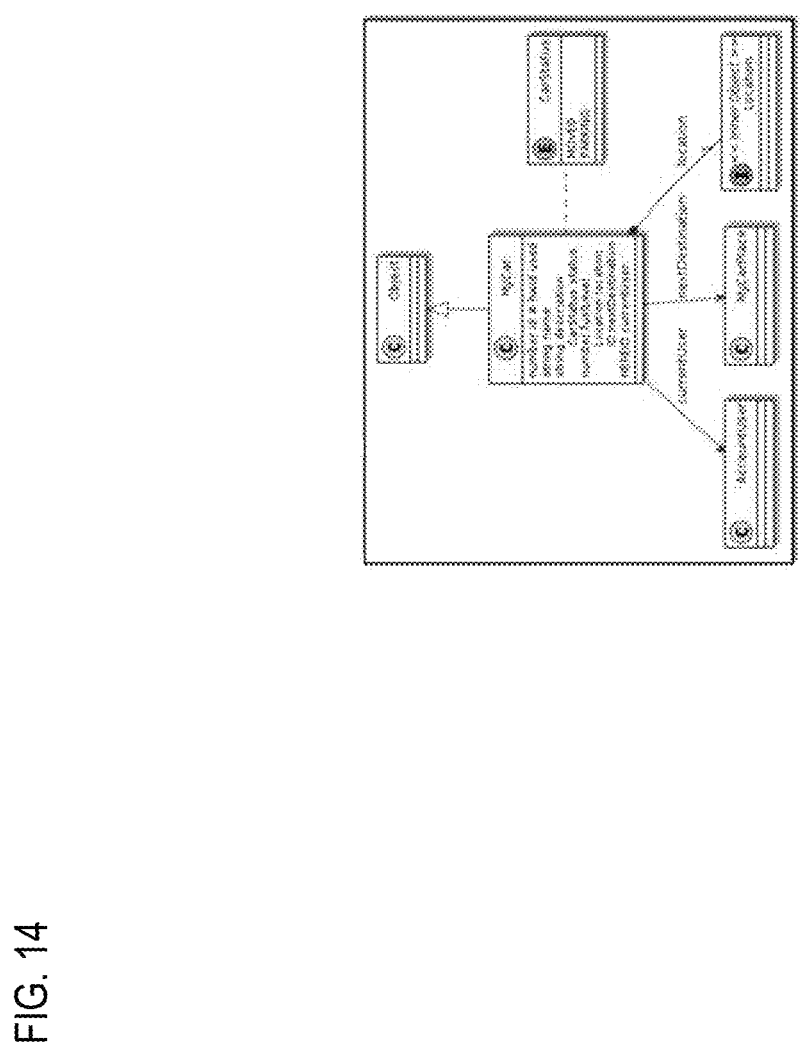
FIG. 14 is a diagram that represents MyCar object, according to one example embodiment.

FIG. 14 is a diagram that represents MyCar object, according to one example embodiment. In one embodiment, MyCar object is a representation of one or more vehicles in the cloud. In one scenario, the MyCar object contains information on the current position, status information and fuel level for the one or more vehicles. The MyCar object may have the following fields:

| Property Name | Type | Description |
| --- | --- | --- |
| currentUser | string | The user ID of the current driver of this car. |
| description | string | Description of this car |
| fuelLevel | number | Contains the remaining possible mileage to drive with current fuel level and consumption in km |
| lastTripOriginId | string | The origin of the last place this car started at |
| location | Location | The location of the car when last synced |
| name | string | User's name for this car |
| nextDestinationId | string | The next destination of this car, a link to a myCarPlace |
| status | string | Indicating the current status of the car as parked or moving |

The fields on the MyCar object can only be updated from the vehicle by using a special authentication method against the cloud and using different application identification credentials. In another scenario, the MyCar object can link one or more vehicles to its current user and to the next planned destination. In one scenario, a car is considered parked if the status is set to 'parking', thereafter the location of the car may be used as the last car position, for example, find my car. In another embodiment, for each vehicle in the cloud the automotive cloud services (ACS) manages a group of users that can read from the MyCar object. This group is created and maintained automatically when the MyCar object is created. In one example embodiment, the MyCar object supports variety of multi-vehicle and multi-user scenario, however the only object shared between users is the MyCar object. In another example embodiment, all the objects of a user may be displayed in the vehicle, independent of which vehicle they were created on.

Figure 15:
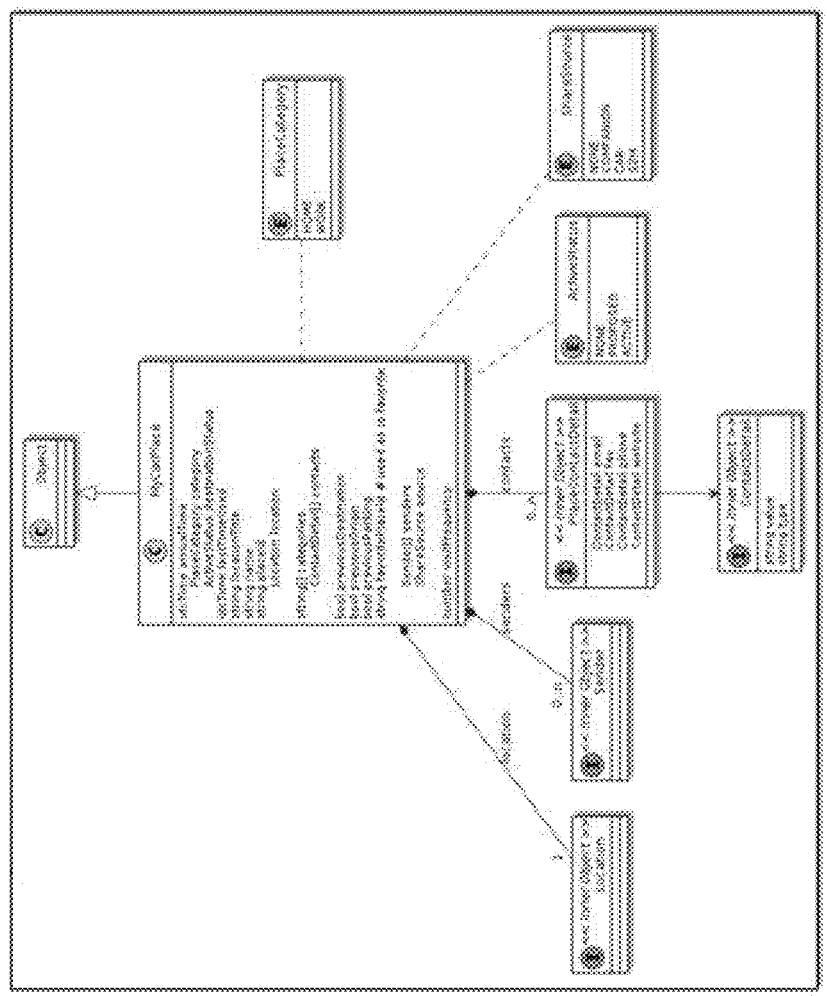
FIG. 15 is a diagram that represents MyCarPlace, according to one example embodiment.

FIG. 15 is a diagram that represents MyCarPlace, according to one example embodiment. In one embodiment, the MyCarPlace is an object type that may be used to save favorite locations, define waypoints in a route, and/or store the last parking location for at least one vehicle. In one example embodiment, the MyCarPlace is considered favorite if the favorite place identification (FavoritePlaceId) is set. There is neither a requirement to point to a valid favorite place, nor does embedded system 135 set this field to point to a favorite place. In another embodiment, the MyCarPlace may be used for sharing location information with other users and/or receiving proposals for the next driving destination. In one scenario, the MyCarPlace is considered as shared if the users' (e.g., senders) object is not empty. It does not matter if it was shared by the user or to the user. In addition, it is considered as shared when the source is S2M. In a further embodiment, the MyCarPlace may be combined with an ObjectNotificationRelation to notify users on the estimated time of arrival at a particular destination. The estimated arrival time of a MyCarPlace may be used in different ways based, at least in part, on the status of a place being active or proposed. A time in the past may be ignored, otherwise it contains the last arrival time, set when passing the waypoint or when reaching the destination after a guidance session.

In one scenario, the MyCarPlace is considered an origin if the previous origin flag is set to true. In another scenario, the MyCarPlace is considered a parking place if the previous parking flag is set to true. In a further scenario, the MyCarPlace is considered as being an active destination if the destination status is active. There should only be one active destination at a time, for example, if new active destination is received by the embedded system 135, the old active destination is dismissed as active destination and is set as proposed destination. The embedded system 135 saves the new active destination as the latest active destination. On the other hand, the MyCarPlace is considered as being a proposed destination if the destination status is proposed. There may be multiple proposed destinations at once. In one example embodiment, a MyCarPlace is considered as the 'home address' if the category is set to home, and the object is marked as a favorite. Furthermore, removing a home address also requires that it be removed from favorites. In one embodiment, the MyCarPlace contains the following fields:

| Property Name | Type | Description |
| --- | --- | --- |
| arrivalTime | integer | UTC timestamp indicating estimated or actual arrival time to a location. |
| categories | Category | The place categories, e.g., petrol-station, eat-and-drink. The first entry is the main category of the place. |
| category | enum | The type of MyCarPlace object, either HOME or WORK or empty. |
| favoritePlaceId | string | Used to indicate that this place is a favorite. Empty if place is not favorite anymore. |
| lastTimeUsed | integer | The last time the place was used to create a route. |
| location | Location | The location of the place, containing the address and other fields |
| locationTitle | string | The title of the place as given by the owner. |
| | | Depending on the type of the MyCarPlace the value should be set to MyCarPlace representing a place: name of place. |
| | | MyCarPlace represents a car: name of Car when object was created (MyCarName). |
| | | MyCarPlace represents a user: "My location" if from geocoder: label from geocoder or as created by client. |
| name | string | Name as given by the user for an object, for example, My Hotel. |
| | | If the user has not set the name, specifically the value may equal the LocationTitle. If the user removes this MyCarPlace from favorites, the original value may be reset from LocationTitle. |
| placeId | string | Unique ID (per user) for storing additional information for a place: |
| | | if MyCarPlace represents a car: "auto-car" + Car ID |
| | | (Car ID is the scbe-id of the corresponding MyCar object); |
| | | if myCarPlace represents a user "auto-user"; |
| | | if myCarPlace represents a place: placeId; |
| | | if myCarPlace represents an locations "auto-loc" + hash |
| previousDestination | boolean | Marks a place as a previous destination |
| previousOrigin | boolean | Marks a place as a previous origin |
| previousParking | boolean | Marks a place as a previous parking location |
| senders | string | Information about a sent object, containing sender, message and other fields. |
| source | enum | The source of the object, CAR, COMPANION, S2M or NONE |
| userData | string | Custom user data, shared by all applications. Should contain a javascript object converted to json. |
| visitFrequency | integer | Counter to measure number of visits to this location. |

Figure 16:
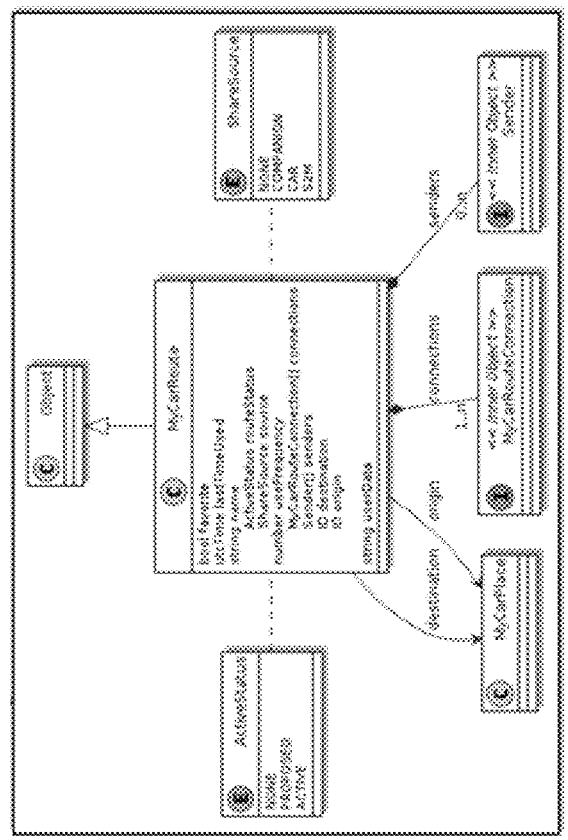
FIG. 16 is a diagram that represents MyCarRoute, according to one example embodiment.

FIG. 16 is a diagram that represents MyCarRoute, according to one example embodiment. In one embodiment, MyCarRoute is the object for storing full routes to the cloud. The routes consist of an origin, and one or more connections. In another embodiment, MyCarRoute may be combined with an ObjectNotificationRelation to notify about the estimated time of arrival for a journey. The estimated arrival time of the MyCarRoute may be used in different manner based, at least in part, on the route status (e.g., active routes contains ETA). Further, a time in the past may be ignored, otherwise it contains the last arrival time, set when arriving at the final destination. In one scenario, the MyCarRoute is considered favorite if the favorite flag is set. In another scenario, the MyCarRoute is considered recent if the use frequency is greater than 0. In a further scenario, the MyCarRoute is considered as shared if the senders' object is not empty, it does not matter if it was shared by the user or to the user. In addition, it is considered as shared when the source is S2M. In another scenario, the MyCarRoute is considered as being an active route if the route status is active, and there should only be one active route at a time. The MyCarRoute may include the following fields:

| Property Name | Type | Description |
| --- | --- | --- |
| arrivalTime | integer | UTC timestamp indicating estimated or actual arrival time to a location. |
| connections | Connection | A list of connections between waypoints, includes route options and type of transport. |
| destination | string | ID of the MyCarPlace object representing the route's destination. Should be the same as the destination property in the last element of this object's connections array. |
| favorite | boolean | Indicates whether the route is marked as favorite by the user. |
| lastTimeUsed | integer | Unix-time based timestamp when this route was last used by this user. May be set by clients when marking the route as active. |
| name | string | Name as given by the user for this route. |
| origin | string | ID of the MyCarPlace object representing this route's origin. |
| routeStatus | string | Marks this instance if it is part of a planned or ongoing guidance session. NONE or ACTIVE. |
| senders | string | Information about a sent object, containing sender, message and other fields. |
| source | string | The source of the object, CAR, COMPANION, S2M or NONE. |
| useFrequency | integer | Counter to measure number of times this route has been used. Set to 0 to delete from recent. This may be increased when the route is set to active. |
| userData | string | Custom user data, shared by all applications. Should contain a javascript object converted to json. |

Figure 17:
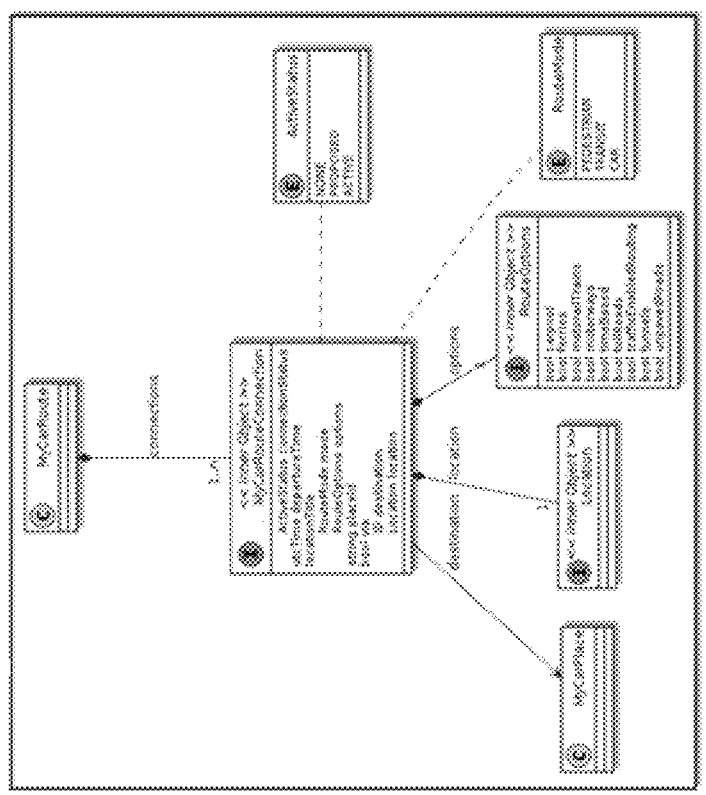
FIG. 17 is a diagram that represents MyCarRouteConnection, according to one example embodiment.

FIG. 17 is a diagram that represents MyCarRouteConnection, according to one example embodiment. In one embodiment, the MyCarRouteConnection objects are connecting the individual stopovers to a route thereby making up a MyCarRoute. In one scenario, the MyCarRoute is considered a multi modal route if the connections have different mode properties. In another scenario, the MyCarRouteConnection is considered as being an active route leg if the route status is active. There should only be one active route at a time. If a new active route leg is received by embedded system 135, but old active route leg is dismissed, and is set to proposed route again. In a further scenario, the MyCarRoute is considered as being a proposed route leg if the route status is proposed. There can be multiple proposed route legs at once. In another embodiment, the estimated arrival time of the MyCarRouteConnection may be used in different ways, if the route leg is active or proposed, it contains the estimated time of arrival. Further, a time in the past may be ignored, otherwise it contains the last arrival time, set when arriving at the destination of the connection. In one scenario, if the destination property is empty or pointing to a deleted object, the composite location object inside the connection should be used. The properties of the MyCarRouteConnection are as follows:

| Property Name | Type | Description |
| --- | --- | --- |
| arrivalTime | integer | UTC timestamp indicating estimated or actual arrival time to a location |
| connectionStatus | string | Marks this route leg if it is part of a planned or ongoing guidance session. NONE, PROPOSED or ACTIVE |

-continued

| Property Name | Type | Description |
| --- | --- | --- |
| departureTime | integer | UTC timestamp indicating estimated or actual departure time from a location |
| destination | string | ID of the MyCarPlace object representing this connection's destination. If this points to an incomplete or deleted object, the location property should be used instead. |
| location | Location | The location of the destination, stored as a copy. Use when destination is empty or pointing to an incomplete or deleted object |
| mode | string | modality of the current route leg one of CAR, PEDESTRIAN, TRANSIT |
| placeId | string | The related placeId, if the destination was received from search. |
| travelTime | integer | Route travel time without traffic based on map available last time the route was planned/used. |
| via | boolean | Indicates whether this waypoint is a via point. Via points should be not considered as a stop over by the application, they are used for customizing a route. |
| options.carpool | boolean | Allow carpool lanes for this route leg, use system default if empty. |
| options.ferries | boolean | Allow ferries for this route leg, use system default if empty. |
| options.motorailTrains | boolean | Allow motor rail trains for this route leg, use system default if empty. |
| options.motorways | boolean | Allow motorways for this route leg, use system default if empty. |
| options.timeBased | boolean | Allow time based routes for this route leg, use system default if empty. |
| options.tollRoads | boolean | Allow toll roads for this route leg, use system default if empty. |
| options.trafficEnabledRouting | boolean | Allow using traffic for this route leg, use system default if empty. |
| options.tunnels | boolean | Allow tunnels for this route leg, use system default if empty. |
| options.unpavedRoads | boolean | Allow unpaved roads for this route leg, use system default if empty. |

Figure 18:
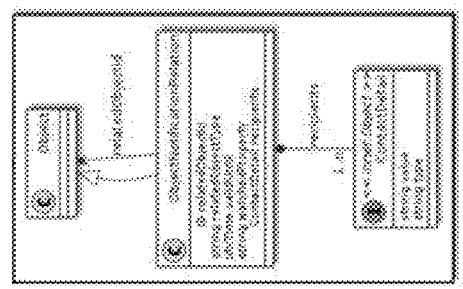
FIG. 18 is a diagram that represents ObjectNotificationRelation, according to one example embodiment.

FIG. 18 is a diagram that represents ObjectNotificationRelation, according to one example embodiment. In one embodiment, the ObjectNotificationRelation monitors changes on another object. Then, a notification is sent out whenever a chosen property changes. In one scenario, this method may be used to send estimated time of arrival updates and for sharing location information. In another scenario, before notification is fully implemented, short messaging service (SMS) and e-mail templates have to be setup in the server. The properties of the ObjectNotificationRelation are as follows:

| Property Name | Type | Description |
| --- | --- | --- |
| recipients[ ].label | string | The type of recipient, eg. email, sms |
| recipients[ ].value | string | The email address or phone number of the recipient |
| relatedObjectId | string | The ID of the related scbe object |
| relatedObjectType | string | The related object's SCBE datamodel name |
| validUntil | integer | After this time notification should not be processed by SCBE notifications system anymore |
| watchedProperty | string | Name of property of the related object to watch |

Figure 19:
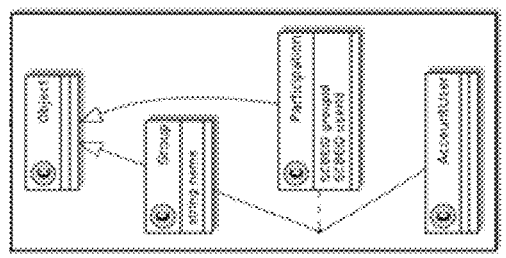
FIG. 19 is a diagram that represents a scenario wherein the group and participation objects are used for ensuring that at least one group of users has access to a specific MyCar object, according to one example embodiment.

FIG. 19 is a diagram that represents a scenario wherein the group and participation objects are used for ensuring that at least one group of users has access to a specific MyCar object, according to one example embodiment.

Figure 20:
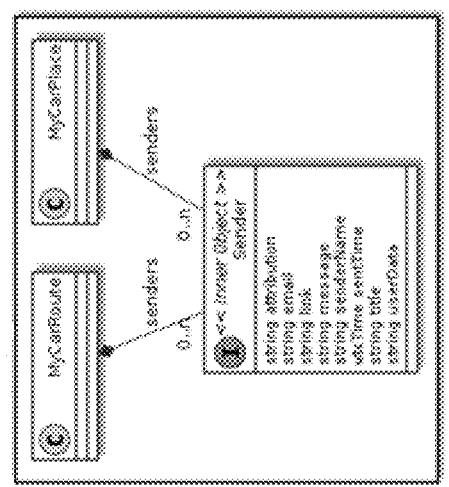
FIG. 20 is a diagram that represents sender object, according to one example embodiment.

FIG. 20 is a diagram that represents sender object, according to one example embodiment. In one embodiment, the sender object contains information about the sharer of a certain object. The sender object comprises of the following fields:

| Property Name | Type | Description |
| --- | --- | --- |
| attribution | string | Information about the source of the sent object, e.g. external provider |
| email | string | Sender's email address |
| link | string | Link to an externals service account, e.g. online social network |
| message | string | Sender's message |
| senderName | string | Sender's name |
| sentTime | integer | When the object was sent |
| title | string | Sender's title of the sent object |
| userData | string | Custom user data, shared by all applications. Should contain a javascript object converted to json. |

Figure 21:
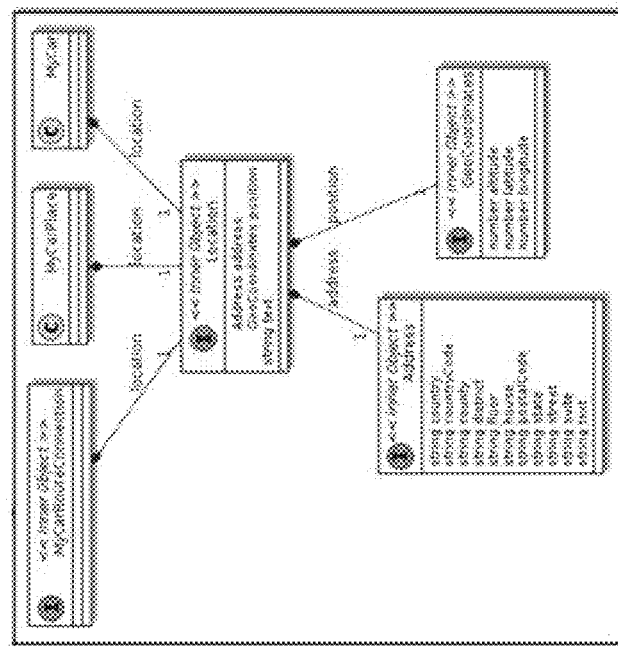
FIG. 21 is a diagram that represents a scenario wherein the internal location object is shared among several other objects, according to one example embodiment.

FIG. 21 is a diagram that represents a scenario wherein the internal location object is shared among several other objects, mainly between the MyCar, the MyCarPlace and the connection object inside the MyCarRoute, according to one example embodiment. The internal location object is a composite inside other objects, and contains location information (e.g., address information for a location, geo-coordinates for a location etc.). In one scenario, if address for an object is unknown or empty, reverse geo-coding is recommended before storing the object. This method is implemented to prevent other clients from being forced to do this. The description for the internal location object is as follows:

| Porperty Name | Type | Description |
|---|---|---|
| address.city | string | The city of the address |
| address.country | string | The country of the address |
| address.countryCode | string | ISO 3166-1 alpha-3 |
| address.county | string | The county of the address |
| address.district | string | The district of the address |
| address.floor | string | The floor of the address |
| address.house | string | house or street number |
| address.postalCode | string | The postal code of the address |
| address.state | string | The state of the address |
| address.street | string | The street of the address |
| address.suite | string | The suite |
| address.text | string | A plain text, human readable representation of the address, possible spanning multiple lines. Rendered according to localized address rules. \n is used as the newline separator. |
| position.altitude | number | Altitude in meters: Optional |
| position.latitude | number | WGS84 decimal degree |
| position.longitude | number | WGS84 decimal degree |
| text | string | A plain text, human readable representation of the location, possible spanning multiple lines. \n is used as the newline separator. |

The processes described herein for synchronizing a function among an embedded system and/or one or more devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 22:
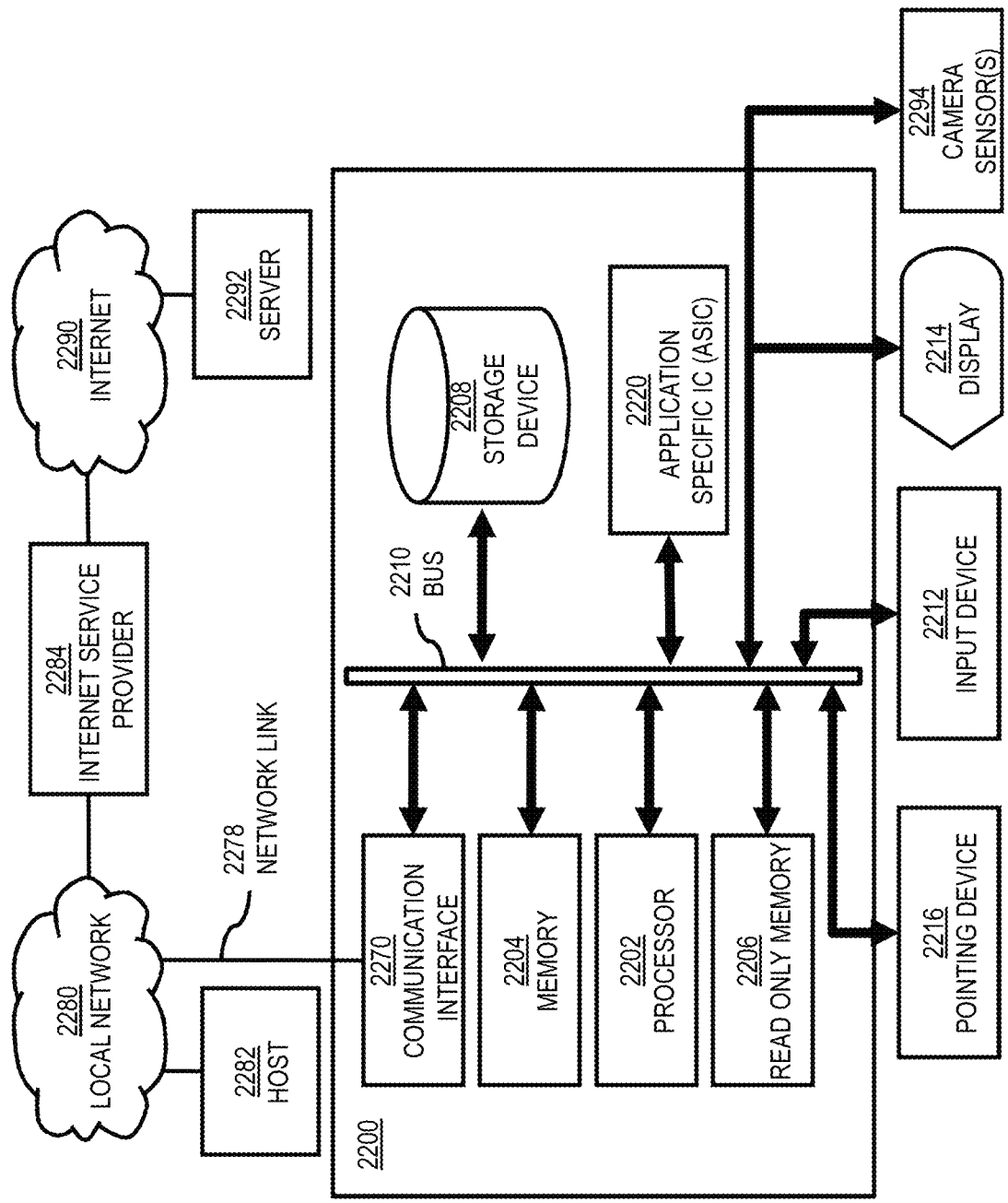
FIG. 22 is a diagram of hardware that can be used to implement an embodiment of the invention.

FIG. 22 illustrates a computer system 2200 upon which an embodiment of the invention may be implemented. Although computer system 2200 is depicted with respect to a particular device or equipment, it is contemplated that other devices or equipment (e.g., network elements, servers, etc.) within FIG. 22 can deploy the illustrated hardware and components of system 2200. Computer system 2200 is programmed (e.g., via computer program code or instructions) to synchronize a function among an embedded system and/or one or more devices as described herein and includes a communication mechanism such as a bus 2210 for passing information between other internal and external components of the computer system 2200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2200, or a portion thereof, constitutes a means for performing one or more steps of synchronizing a function among an embedded system and/or one or more devices. A bus 2210 includes one or more parallel conductors of information so that information is transferred quickly among devices coupled to the bus 2210. One or more processors 2202 for processing information are coupled with the bus 2210.

A processor (or multiple processors) 2202 performs a set of operations on information as specified by computer program code related to synchronizing a function among an embedded system and/or one or more devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2210 and placing information on the bus 2210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 2200 also includes a memory 2204 coupled to bus 2210. The memory 2204, such as a random access memory (RAM) or any other dynamic storage device, stores information including processor instructions for synchronizing a function among an embedded system and/or one or more devices. Dynamic memory allows information stored therein to be changed by the computer system 2200. RAM allows a unit of information stored at a location called a memory address to be stored and retrieved independently of information at neighboring addresses. The memory 2204 is also used by the processor 2202 to store temporary values during execution of processor instructions. The computer system 2200 also includes a read only memory (ROM) 2206 or any other static storage device coupled to the bus 2210 for storing static information, including instructions, that is not changed by the computer system 2200. Some memory is composed of volatile storage that loses the information stored thereon when power is lost. Also coupled to bus 2210 is a non-volatile (persistent) storage device 2208, such as a magnetic disk, optical disk or flash card, for storing information, including instructions, that persists even when the computer system 2200 is turned off or otherwise loses power.

Information, including instructions for synchronizing a function among an embedded system and/or one or more devices, is provided to the bus 2210 for use by the processor from an external input device 2212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2200. Other external devices coupled to bus 2210, used primarily for interacting with humans, include a display device 2214, such as a cathode ray tube (CRT), a liquid crystal display (LCD), a light emitting diode (LED) display, an organic LED (OLED) display, a plasma screen, or a printer for presenting text or images, and a pointing device 2216, such as a mouse, a trackball, cursor direction keys, or a motion sensor, for controlling a position of a small cursor image presented on the display 2214 and issuing commands associated with graphical elements presented on the display 2214, and one or more camera sensors 2294 for capturing, recording and causing to store one or more still and/or moving images (e.g., videos, movies, etc.) which also may comprise audio recordings. In some embodiments, for example, in embodiments in which the computer system 2200 performs all functions automatically without human input, one or more of external input device 2212, display device 2214 and pointing device 2216 may be omitted.

In the illustrated embodiment, special purpose hardware, such as an application specific integrated circuit (ASIC) 2220, is coupled to bus 2210. The special purpose hardware is configured to perform operations not performed by processor 2202 quickly enough for special purposes. Examples of ASICs include graphics accelerator cards for generating images for display 2214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2200 also includes one or more instances of a communications interface 2270 coupled to bus 2210. Communication interface 2270 provides a one-way or two-way communication coupling to a variety of external devices that operate with their own processors, such as printers, scanners and external disks. In general the coupling is with a network link 2278 that is connected to a local network 2280 to which a variety of external devices with their own processors are connected. For example, communication interface 2270 may be a parallel port or a serial port or a universal serial bus (USB) port on a personal computer. In some embodiments, communications interface 2270 is an integrated services digital network (ISDN) card or a digital subscriber line (DSL) card or a telephone modem that provides an information communication connection to a corresponding type of telephone line. In some embodiments, a communication interface 2270 is a cable modem that converts signals on bus 2210 into signals for a communication connection over a coaxial cable or into optical signals for a communication connection over a fiber optic cable. As another example, communications interface 2270 may be a local area network (LAN) card to provide a data communication connection to a compatible LAN, such as Ethernet. Wireless links may also be implemented. For wireless links, the communications interface 2270 sends or receives or both sends and receives electrical, acoustic or electromagnetic signals, including infrared and optical signals, that carry information streams, such as digital data. For example, in wireless handheld devices, such as mobile telephones like cell phones, the communications interface 2270 includes a radio band electromagnetic transmitter and receiver called a radio transceiver. In certain embodiments, the communications interface 2270 enables connection to the communication network 107 for synchronizing a function among an embedded system and/or one or more devices to the UE 101.

The term "computer-readable medium" as used herein refers to any medium that participates in providing information to processor 2202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2208. Volatile media include, for example, dynamic memory 2204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2220.

Network link 2278 typically provides information communication using transmission media through one or more networks to other devices that use or process the information. For example, network link 2278 may provide a connection through local network 2280 to a host computer 2282 or to equipment 2284 operated by an Internet Service Provider (ISP). ISP equipment 2284 in turn provides data communication services through the public, world-wide packet-switching communication network of networks now commonly referred to as the Internet 2290.

A computer called a server host 2292 connected to the Internet hosts a process that provides a service in response to information received over the Internet. For example, server host 2292 hosts a process that provides information representing video data for presentation at display 2214. It is contemplated that the components of system 2200 can be deployed in various configurations within other computer systems, e.g., host 2282 and server 2292.

At least some embodiments of the invention are related to the use of computer system 2200 for implementing some or all of the techniques described herein. According to one embodiment of the invention, those techniques are performed by computer system 2200 in response to processor 2202 executing one or more sequences of one or more processor instructions contained in memory 2204. Such instructions, also called computer instructions, software and program code, may be read into memory 2204 from another computer-readable medium such as storage device 2208 or network link 2278. Execution of the sequences of instructions contained in memory 2204 causes processor 2202 to perform one or more of the method steps described herein. In alternative embodiments, hardware, such as ASIC 2220, may be used in place of or in combination with software to implement the invention. Thus, embodiments of the invention are not limited to any specific combination of hardware and software, unless otherwise explicitly stated herein.

The signals transmitted over network link 2278 and other networks through communications interface 2270, carry information to and from computer system 2200. Computer system 2200 can send and receive information, including program code, through the networks 2280, 2290 among others, through network link 2278 and communications interface 2270. In an example using the Internet 2290, a server host 2292 transmits program code for a particular application, requested by a message sent from computer 200, through Internet 2290, ISP equipment 2284, local network 2280 and communications interface 2270. The received code may be executed by processor 2202 as it is received, or may be stored in memory 2204 or in storage device 2208 or any other non-volatile storage for later execution, or both. In this manner, computer system 2200 may obtain application program code in the form of signals on a carrier wave.

Various forms of computer readable media may be involved in carrying one or more sequence of instructions or data or both to processor 2202 for execution. For example, instructions and data may initially be carried on a magnetic disk of a remote computer such as host 2282. The remote computer loads the instructions and data into its dynamic memory and sends the instructions and data over a telephone line using a modem. A modem local to the computer system 2200 receives the instructions and data on a telephone line and uses an infra-red transmitter to convert the instructions and data to a signal on an infra-red carrier wave serving as the network link 2278. An infrared detector serving as communications interface 2270 receives the instructions and data carried in the infrared signal and places information representing the instructions and data onto bus 2210. Bus 2210 carries the information to memory 2204 from which processor 2202 retrieves and executes the instructions using some of the data sent with the instructions. The instructions and data received in memory 2204 may optionally be stored on storage device 2208, either before or after execution by the processor 2202.

FIG. 23 illustrates a chip set or chip 2300 upon which an embodiment of the invention may be implemented. Chip set 2300 is programmed to synchronize a function among an embedded system and/or one or more devices as described herein and includes, for instance, the processor and memory components described with respect to FIG. 22 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2300 can be implemented in a single chip. It is further contemplated that in certain embodiments the chip set or chip 2300 can be implemented as a single "system on a chip." It is further contemplated that in certain embodiments a separate ASIC would not be used, for example, and that all relevant functions as disclosed herein would be performed by a processor or processors. Chip set or chip 2300, or a portion thereof, constitutes a means for performing one or more steps of providing user interface navigation information associated with the availability of functions. Chip set or chip 2300, or a portion thereof, constitutes a means for performing one or more steps of synchronizing a function among an embedded system and/or one or more devices.

In one embodiment, the chip set or chip 2300 includes a communication mechanism such as a bus 2301 for passing information among the components of the chip set 2300. A processor 2303 has connectivity to the bus 2301 to execute instructions and process information stored in, for example, a memory 2305. The processor 2303 may include one or more processing cores with each core configured to perform independently. A multi-core processor enables multiprocessing within a single physical package. Examples of a multi-core processor include two, four, eight, or greater numbers of processing cores. Alternatively or in addition, the processor 2303 may include one or more microprocessors configured in tandem via the bus 2301 to enable independent execution of instructions, pipelining, and multithreading. The processor 2303 may also be accompanied with one or more specialized components to perform certain processing functions and tasks such as one or more digital signal processors (DSP) 2307, or one or more application-specific integrated circuits (ASIC) 2309. A DSP 2307 typically is configured to process real-world signals (e.g., sound) in real time independently of the processor 2303. Similarly, an ASIC 2309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 2300 includes merely one or more processors and some software and/or firmware supporting and/or relating to and/or for the one or more processors.

The processor 2303 and accompanying components have connectivity to the memory 2305 via the bus 2301. The memory 2305 includes both dynamic memory (e.g., RAM, magnetic disk, writable optical disk, etc.) and static memory (e.g., ROM, CD-ROM, etc.) for storing executable instructions that when executed perform the inventive steps described herein to synchronize a function among an embedded system and/or one or more devices. The memory 2305 also stores the data associated with or generated by the execution of the inventive steps.

Figure 24:
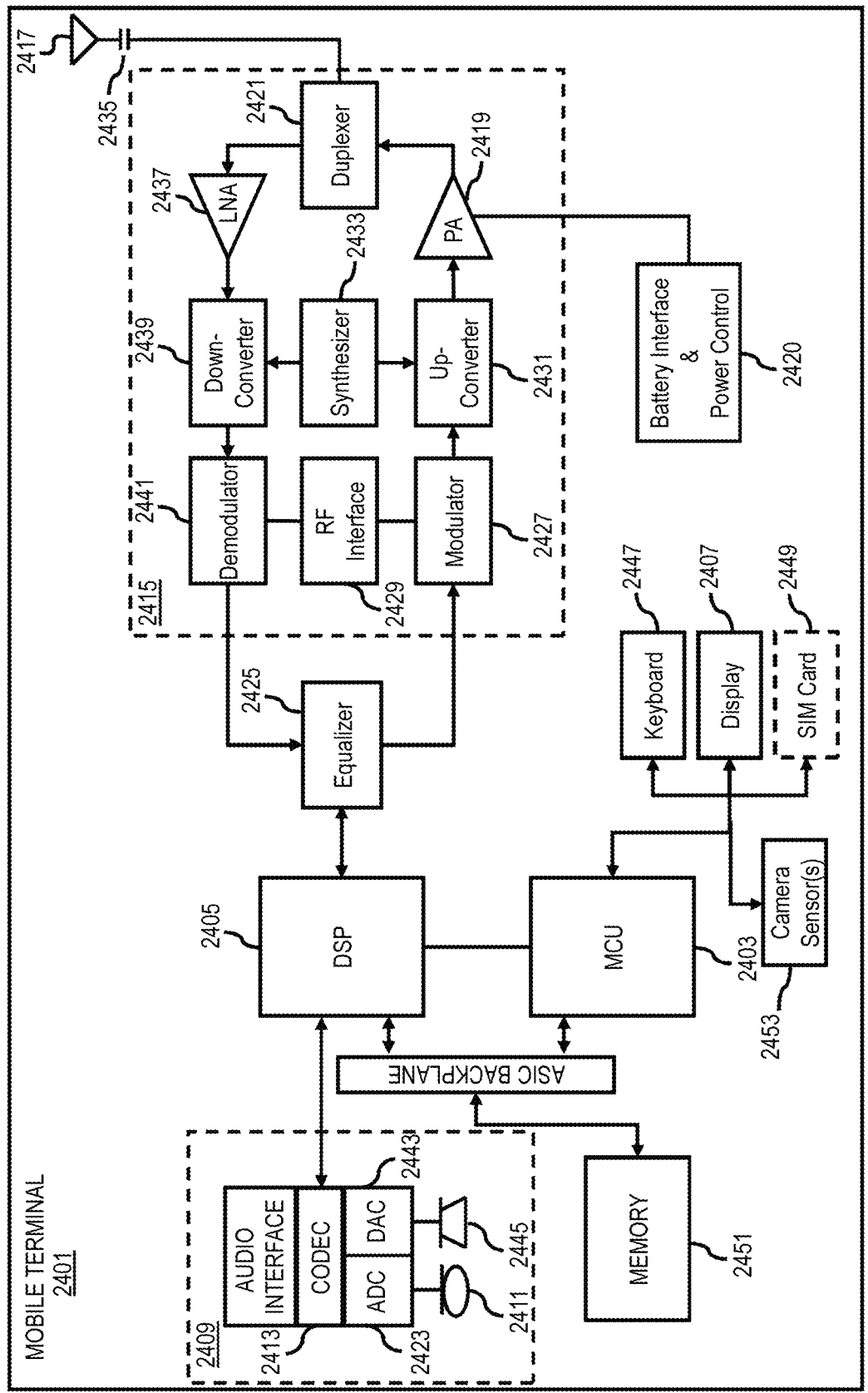
FIG. 24 is a diagram of a mobile terminal (e.g., handset) that can be used to implement an embodiment of the invention.

FIG. 24 is a diagram of exemplary components of a mobile terminal (e.g., handset) for communications, which is capable of operating in the system of FIG. 1A, according to one embodiment. In some embodiments, mobile terminal 2401, or a portion thereof, constitutes a means for performing one or more steps of synchronizing a function among an embedded system and/or one or more devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform in various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2403, a Digital Signal Processor (DSP) 2405, and a receiver/transmitter unit including a microphone gain control unit and a speaker gain control unit. A main display unit 2407 provides a display to the user in support of various applications and mobile terminal functions that perform or support the steps of synchronizing a function among an embedded system and/or one or more devices. The display 2407 includes display circuitry configured to display at least a portion of a user interface of the mobile terminal (e.g., mobile telephone). Additionally, the display 2407 and display circuitry are configured to facilitate user control of at least some functions of the mobile terminal. An audio function circuitry 2409 includes a microphone 2411 and microphone amplifier that amplifies the speech signal output from the microphone 2411. The amplified speech signal output from the microphone 2411 is fed to a coder/decoder (CODEC) 2413.

A radio section 2415 amplifies power and converts frequency in order to communicate with a base station, which is included in a mobile communication system, via antenna 417. The power amplifier (PA) 2419 and the transmitter/modulation circuitry are operationally responsive to the MCU 2403, with an output from the PA 2419 coupled to the duplexer 2421 or circulator or antenna switch, as known in the art. The PA 2419 also couples to a battery interface and power control unit 2420.

In use, a user of mobile terminal 2401 speaks into the microphone 2411 and his or her voice along with any detected background noise is converted into an analog voltage. The analog voltage is then converted into a digital signal through the Analog to Digital Converter (ADC) 2423. The control unit 2403 routes the digital signal into the DSP 2405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2425 for compensation of any frequency-dependent impairments that occur during transmission though the air such as phase and amplitude distortion. After equalizing the bit stream, the modulator 2427 combines the signal with a RF signal generated in the RF interface 2429. The modulator 2427 generates a sine wave by way of frequency or phase modulation. In order to prepare the signal for transmission, an up-converter 2431 combines the sine wave output from the modulator 2427 with another sine wave generated by a synthesizer 2411 to achieve the desired frequency of transmission. The signal is then sent through a PA 2419 to increase the signal to an appropriate power level. In practical systems, the PA 2419 acts as a variable gain amplifier whose gain is controlled by the DSP 2405 from information received from a network base station. The signal is then filtered within the duplexer 2421 and optionally sent to an antenna coupler 2435 to match impedances to provide maximum power transfer. Finally, the signal is transmitted via antenna 2417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2401 are received via antenna 2417 and immediately amplified by a low noise amplifier (LNA) 2437. A down-converter 2439 lowers the carrier frequency while the demodulator 2441 strips away the RF leaving only a digital bit stream. The signal then goes through the equalizer 2425 and is processed by the DSP 2405. A Digital to Analog Converter (DAC) 2443 converts the signal and the resulting output is transmitted to the user through the speaker 2445, all under control of a Main Control Unit (MCU) 2403 which can be implemented as a Central Processing Unit (CPU).

The MCU 2403 receives various signals including input signals from the keyboard 2447. The keyboard 2447 and/or the MCU 2403 in combination with other user input components (e.g., the microphone 2411) comprise a user interface circuitry for managing user input. The MCU 2403 runs a user interface software to facilitate user control of at least some functions of the mobile terminal 2401 to synchronize a function among an embedded system and/or one or more devices. The MCU 2403 also delivers a display command and a switch command to the display 2407 and to the speech output switching controller, respectively. Further, the MCU 2403 exchanges information with the DSP 2405 and can access an optionally incorporated SIM card 2449 and a memory 2451. In addition, the MCU 2403 executes various control functions required of the terminal. The DSP 2405 may, depending upon the implementation, perform any of a variety of conventional digital processing functions on the voice signals. Additionally, DSP 2405 determines the background noise level of the local environment from the signals detected by microphone 2411 and sets the gain of microphone 2411 to a level selected to compensate for the natural tendency of the user of the mobile terminal 2401.

The CODEC 2413 includes the ADC 2423 and DAC 2443. The memory 2451 stores various data including call incoming tone data and is capable of storing other data including music data received via, e.g., the global Internet. The software module could reside in RAM memory, flash memory, registers, or any other faun of writable storage medium known in the art. The memory device 2451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2449 carries, for instance, important information, such as the cellular phone number, the carrier supplying service, subscription details, and security information. The SIM card 2449 serves primarily to identify the mobile terminal 2401 on a radio network. The card 2449 also contains a memory for storing a personal telephone number registry, text messages, and user specific mobile terminal settings.

Further, one or more camera sensors 2453 may be incorporated onto the mobile station 2401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method comprising:
    causing an authentication of at least one user at an embedded system;
    causing, an association of the at least one user with at least one cloud account associated with the embedded system;
    causing a registration of one or more portable devices associated with the at least one user to the at least one cloud account;
    causing a synchronization of at least one function, data associated with the at least one function, or a combination thereof between the at least one embedded system and the one or more portable devices based on the registration;
    determining a cancellation of a multi-modal navigation in the at least one embedded system before a destination; and
    causing an initiation of the multi-modal navigation in the one or more portable devices.

2. A method of claim 1, wherein the authentication includes predefined values, a preset username and password, user identification, device identification, other authentication mechanisms, or a combination thereof.

3. A method of claim 1, further comprising:
    receiving an input from the at least one user to access the embedded system; and
    causing a selection of at least one vehicle linked to the cloud account associated with the embedded system,
    wherein a newly added vehicle is selected from the plurality of linked vehicles.

4. A method of claim 1, wherein determining the multi-modal routing information further comprises:
    determining that the at least one embedded system, the one or more portable devices, or a combination thereof is within at least one distance threshold from at least one waypoint; and
    processing and/or facilitating a processing of location information, mapping information, or a combination thereof to generate a recommendation of at least one walking segment, at least one driving segment, at least one transport line, or a combination thereof.

5. A method of claim 4, further comprising:
    causing a linking of the one or more portable devices, the embedded system, the cloud, or a combination thereof; and
    causing the synchronization of the recommendation among the at least one embedded system, the one or more portable devices, or a combination thereof for real-time transmission.

6. A method of claim 4, further comprising:
    determining that the at least one embedded system, the one or more portable devices, or a combination thereof exceeds the at least one distance threshold; and
    causing a notification to the one or more portable devices guiding the at least one user back to the vehicle.

7. A method of claim 4, further comprising:
    causing a conversion of one or more completed route segments to inactive status, a notification of at least one current active route segment, or a combination thereof; and
    causing a presentation of the notification as at least one push notification to the at least one embedded system, the one or more portable devices, or a combination thereof.

8. A method of claim 1, further comprising:
    causing a detection of a plurality of similar active route segments in the at least one embedded system, the one or more portable devices, or a combination thereof; and
    causing a storing of a newest active route segment, a deactivating of at least one old active route segment, or a combination thereof at the at least one embedded system, the one or more portable devices, or a combination thereof.

9. A method of claim 1, further comprising:
    causing a modification of the multi-modal navigation in the at least one embedded system, the one or more portable devices, or a combination thereof based, at least in part, on user preference, user interaction, or a combination thereof,
    wherein the user interaction includes a touch-based interaction with a mapping user interface associated with the at least one embedded system, the one or more portable devices, or a combination thereof.

10. An apparatus comprising:
    at least one processor; and
    at least one memory including computer program code for one or more programs, the at least one memory and the computer program code configured to, with the at least one processor, cause the apparatus to perform at least the following;
        cause an authentication of at least one user at an embedded system;
        cause an association of the at least one user with at least one cloud account associated with the embedded system;
        cause a registration of one or more portable devices associated with the at least one user to the at least one cloud account;
        cause a synchronization of at least one function, data associated with the at least one function, or a combination thereof between the at least one embedded system and the one or more portable devices based on the registration;
        determine a cancellation of a multi-modal navigation in the at least one embedded system before a destination; and
        cause an initiation of the multi-modal navigation in the one or more portable devices.

11. An apparatus of claim 10, wherein the authentication includes predefined values, a preset username and password, user identification, device identification, other authentication mechanisms, or a combination thereof.

12. An apparatus of claim 10, wherein the apparatus is further caused to:
    receive an input from the at least one user to access the embedded system; and
    cause a selection of at least one vehicle linked to the cloud account associated with the embedded system,
    wherein a newly added vehicle is selected from the plurality of linked vehicles.

13. An apparatus of claim 10, wherein determination of the multi-modal routing information further causes the apparatus to:
    determine that the at least one embedded system, the one or more portable devices, or a combination thereof is within at least one distance threshold from at least one waypoint; and process and/or facilitate a processing of location information, mapping information, or a combination thereof to generate a recommendation of at least one walking segment, at least one driving segment, at least one transport line, or a combination thereof.

14. An apparatus of claim 13, wherein the apparatus is further caused to:
   cause a linking of the one or more portable devices, the embedded system, the cloud, or a combination thereof; and
   cause the synchronization of the recommendation among the at least one embedded system, the one or more portable devices, or a combination thereof for real-time transmission.

15. An apparatus of claim 13, wherein the apparatus is further caused to:
   determine that the at least one embedded system, the one or more portable devices, or a combination thereof exceeds the at least one distance threshold; and
   cause a notification to the one or more portable devices guiding the at least one user back to the vehicle.

16. An apparatus of claim 13, wherein the apparatus is further caused to:
   cause a conversion of one or more completed route segments to inactive status, a notification of at least one current active route segment, or a combination thereof; and
   cause a presentation of the notification as at least one push notification to the at least one embedded system, the one or more portable devices, or a combination thereof.

17. A computer-readable storage medium carrying one or more sequences of one or more instructions which, when executed by one or more processors, cause an apparatus to perform:
   causing an authentication of at least one user at an embedded system;
   causing an association of the at least one user with at least one cloud account associated with the embedded system;
   causing a registration of one or more portable devices associated with the at least one user to the at least one cloud account;
   causing a synchronization of at least one function, data associated with the at least one function, or a combination thereof between the at least one embedded system and the one or more portable devices based on the registration;
   determining a cancellation of a multi-modal navigation in the at least one embedded system before a destination; and
   causing an initiation of the multi-modal navigation in the one or more portable devices.

18. A computer-readable storage medium of claim 17, wherein the apparatus is caused to perform:
   receiving an input from the at least one user to access the embedded system; and
   causing a selection of at least one vehicle linked to the cloud account associated with the embedded system,
   wherein a newly added vehicle is selected from the plurality of linked vehicles.

19. A computer-readable storage medium of claim 17, wherein determining the multi-modal routing information causes the apparatus to perform:
   determining that the at least one embedded system, the one or more portable devices, or a combination thereof is within at least one distance threshold from at least one waypoint; and
   processing and/or facilitating a processing of location information, mapping information, or a combination thereof to generate a recommendation of at least one walking segment, at least one driving segment, at least one transport line, or a combination thereof.

* * * * *